United States Patent
Wool et al.

(10) Patent No.: US 7,009,141 B1
(45) Date of Patent: Mar. 7, 2006

(54) ROTARY SCANNING LASER HEAD WITH COAXIAL REFRACTIVE OPTICS

(75) Inventors: Mitchell R. Wool, Sunnyvale, CA (US); James W. Thomas, Los Altos, CA (US)

(73) Assignee: General Lasertronics Corp., San Jose, CA (US)

( * ) Notice: Subject to any disclaimer, the term of this patent is extended or adjusted under 35 U.S.C. 154(b) by 539 days.

(21) Appl. No.: 10/272,329

(22) Filed: Oct. 15, 2002

Related U.S. Application Data

(60) Provisional application No. 60/329,388, filed on Oct. 13, 2001.

(51) Int. Cl.
    *B23K 26/36*    (2006.01)
(52) U.S. Cl. ............................. 219/121.73; 219/121.8
(58) Field of Classification Search ........... 219/121.73, 219/121.75, 121.78, 121.79, 121.8, 121.81, 219/121.83
    See application file for complete search history.

(56) References Cited

U.S. PATENT DOCUMENTS

| | | | | |
|---|---|---|---|---|
| 4,316,074 A | * | 2/1982 | Daly ....................... 219/121.6 |
| 4,911,711 A | * | 3/1990 | Telfair et al. ................... 606/5 |
| RE33,777 E | * | 12/1991 | Woodroffe ...................... 134/1 |
| 5,391,165 A | * | 2/1995 | Fountain et al. ................ 606/4 |
| 5,643,476 A | * | 7/1997 | Garmire et al. ........ 219/121.68 |
| 5,780,806 A | * | 7/1998 | Ferguson et al. ...... 219/121.68 |
| 6,450,180 B1 | * | 9/2002 | Zahavi et al. ................ 134/1.3 |

* cited by examiner

*Primary Examiner*—Samuel M. Heinrich
(74) *Attorney, Agent, or Firm*—George M. Steres

(57) ABSTRACT

A rotary refractive laser scanner head uses two sets of lenses and prisms aligned along a common optical axis. Each prism is paired with one of the lenses. The lens-prism pairs are separately mounted rotatable on a common axis coaxial with the optical axis. A motor drives two gear sets. Each gear set is separately coupled to one of the two lens-prism pairs and rotates them at selected, typically different speeds. An input laser beam is directed along the optical axis at one of the lens-prism pairs. The first pair collimates and refracts the input beam into an intermediate deflected beam according to Snell's law and the characteristics of the laser beam and optics. The second pair receives the intermediate beam and further deflects it to form an output beam. By selecting the motor speed, gear ratios, optics spacing, characteristics and prism wedge (deflection) angle, the scanner head effectively can scan an output laser beam over a desired pattern area.

19 Claims, 15 Drawing Sheets

CRO cross-section and clean purge flow path

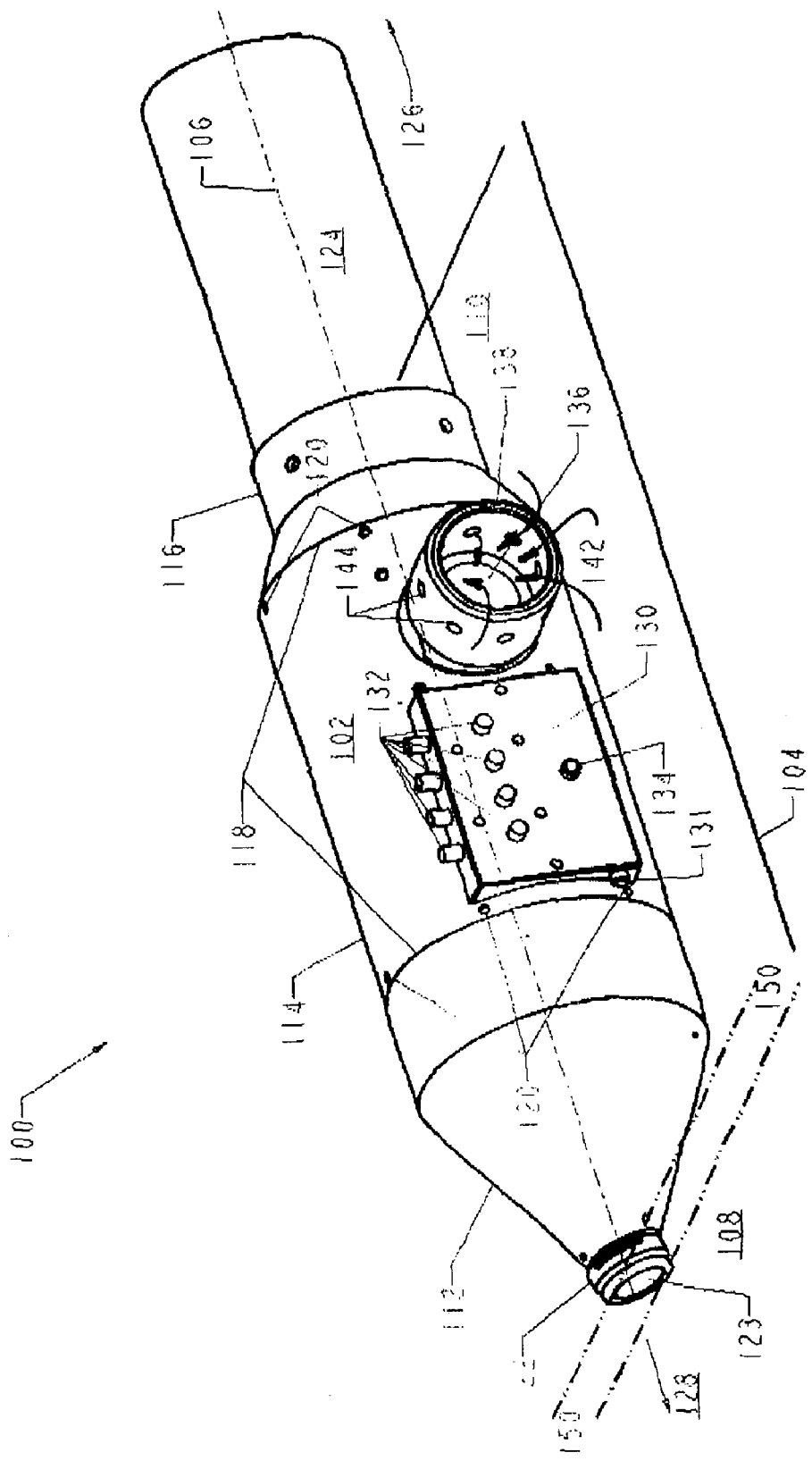
Figure 1. Perspective view of RSL head embodiment

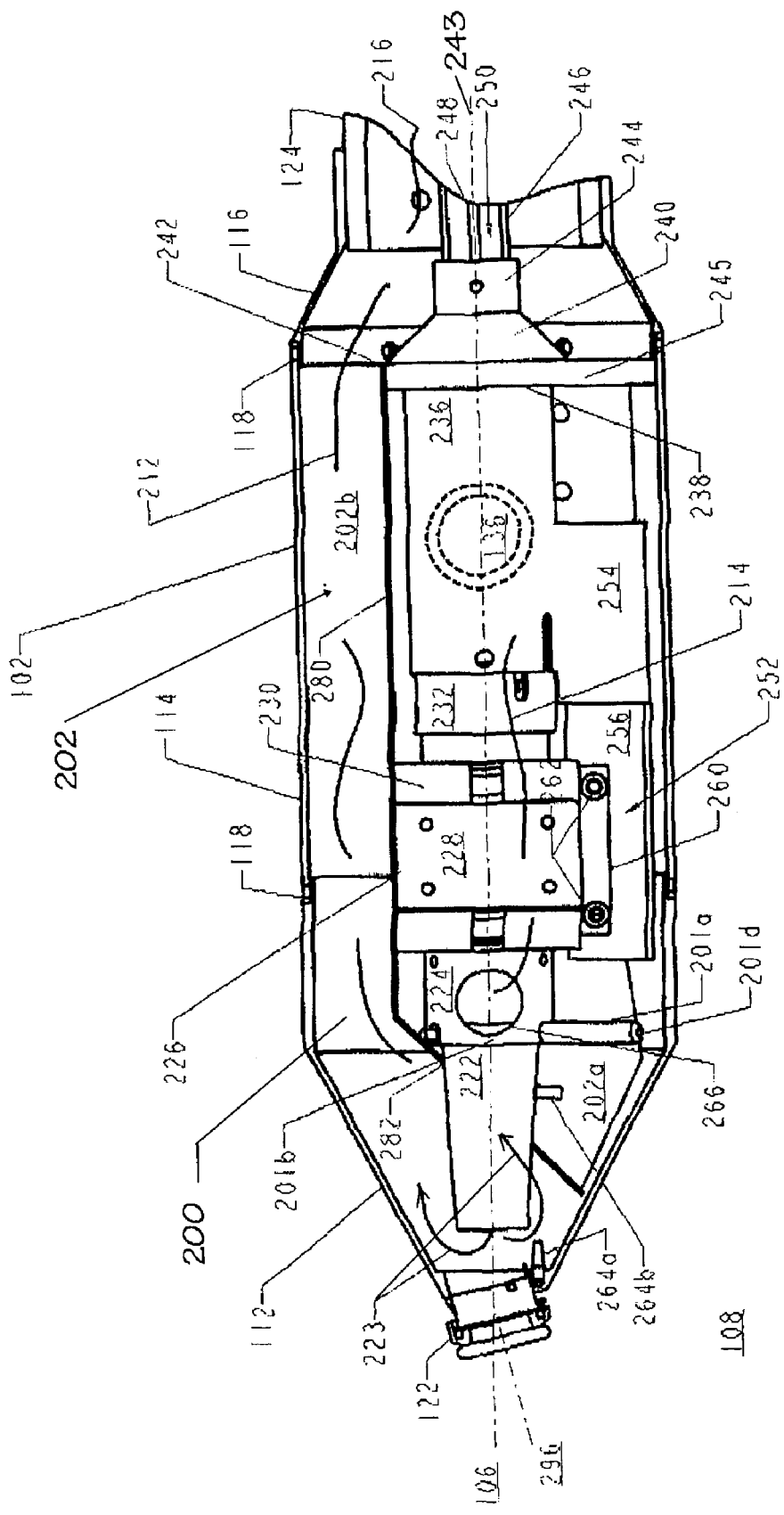
Figure 2a. Elevation view of RSL housing interior

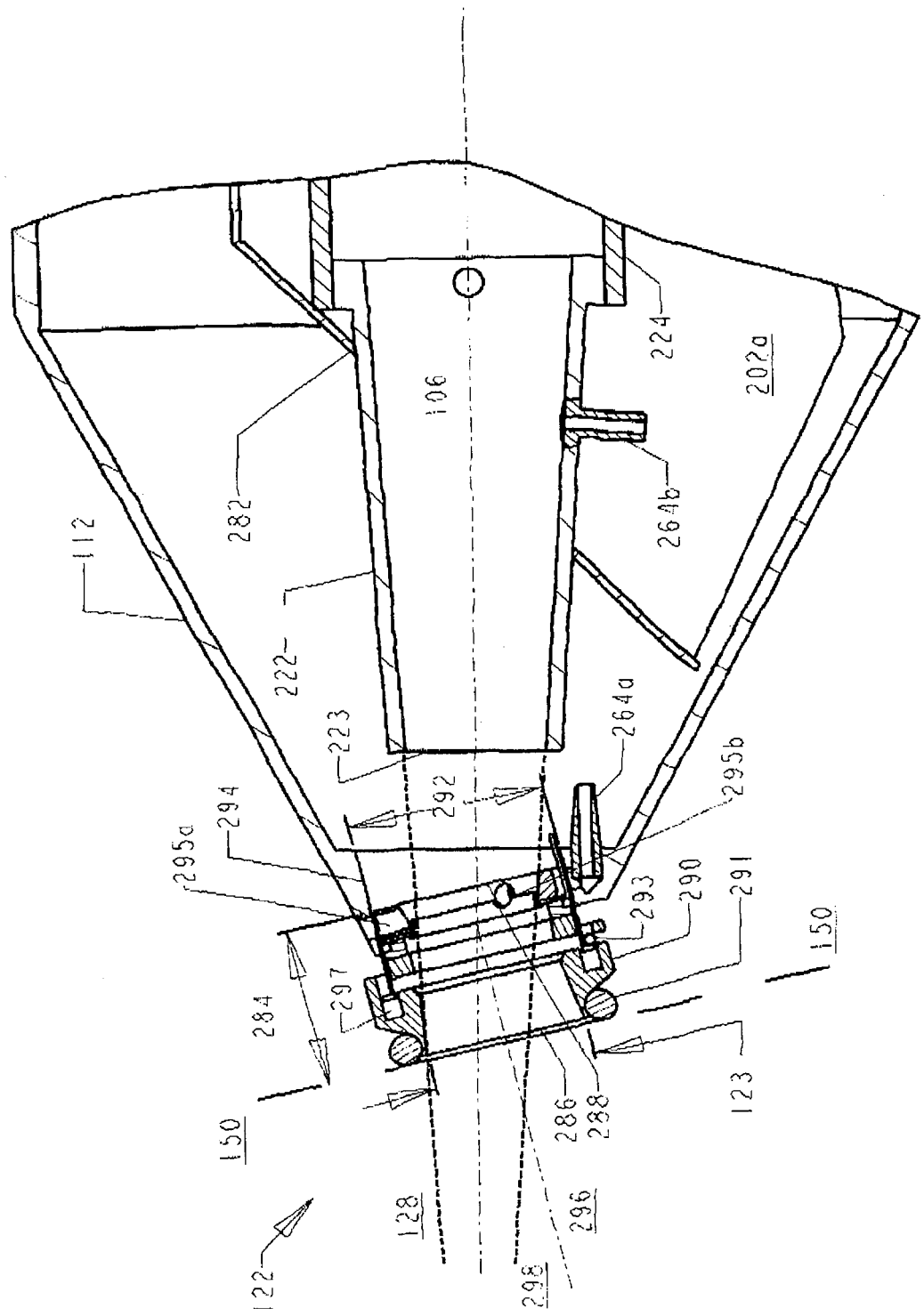
Fig. 2b. Nosepiece Detail

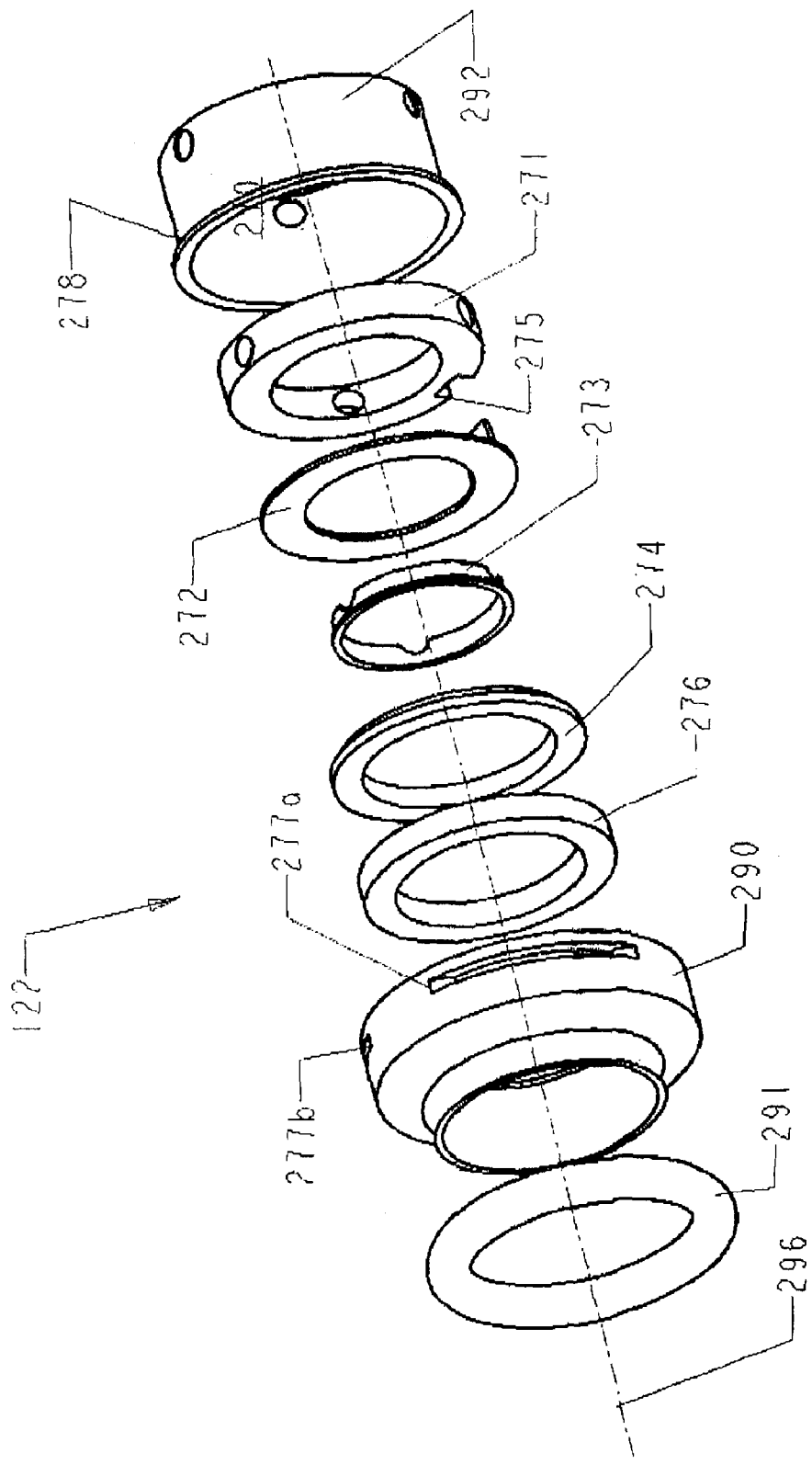
Figure 2c. Coaxial elements of the nosepiece including BPS contact sensor

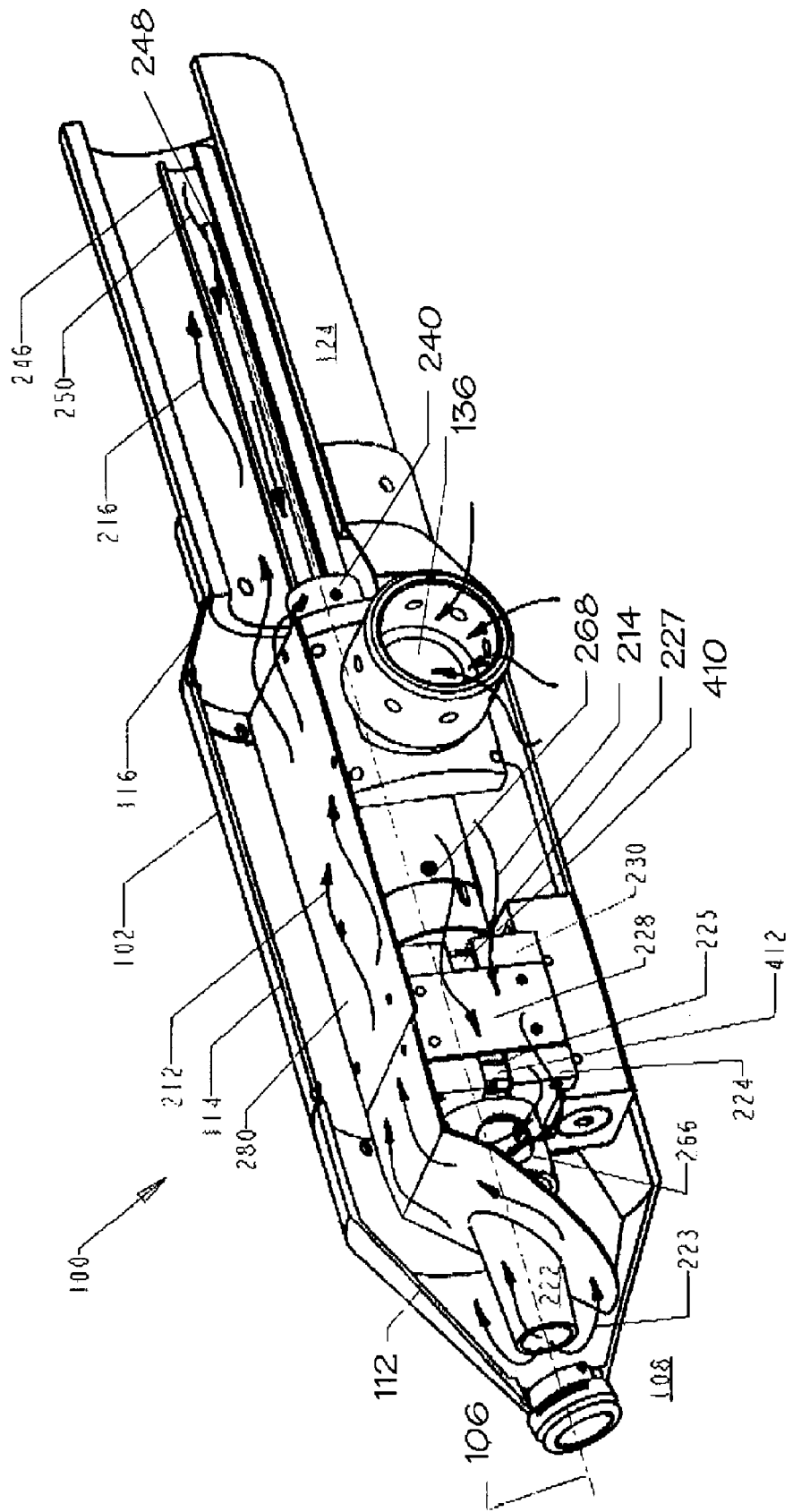
Figure 3. Purge gas flow passages and sensor ports within the RSL head

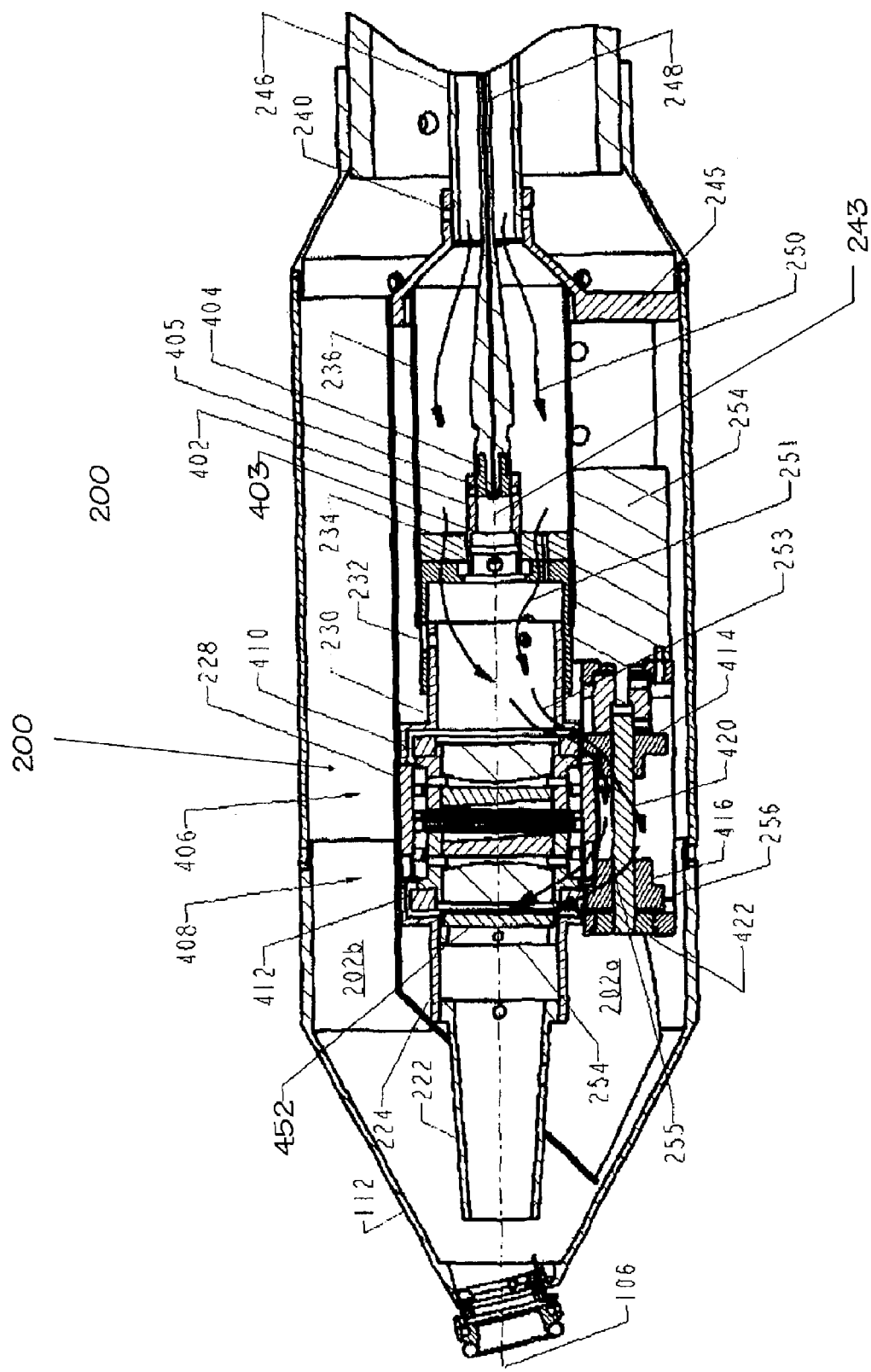
Fig. 4. CRO cross-section and clean purge flow path

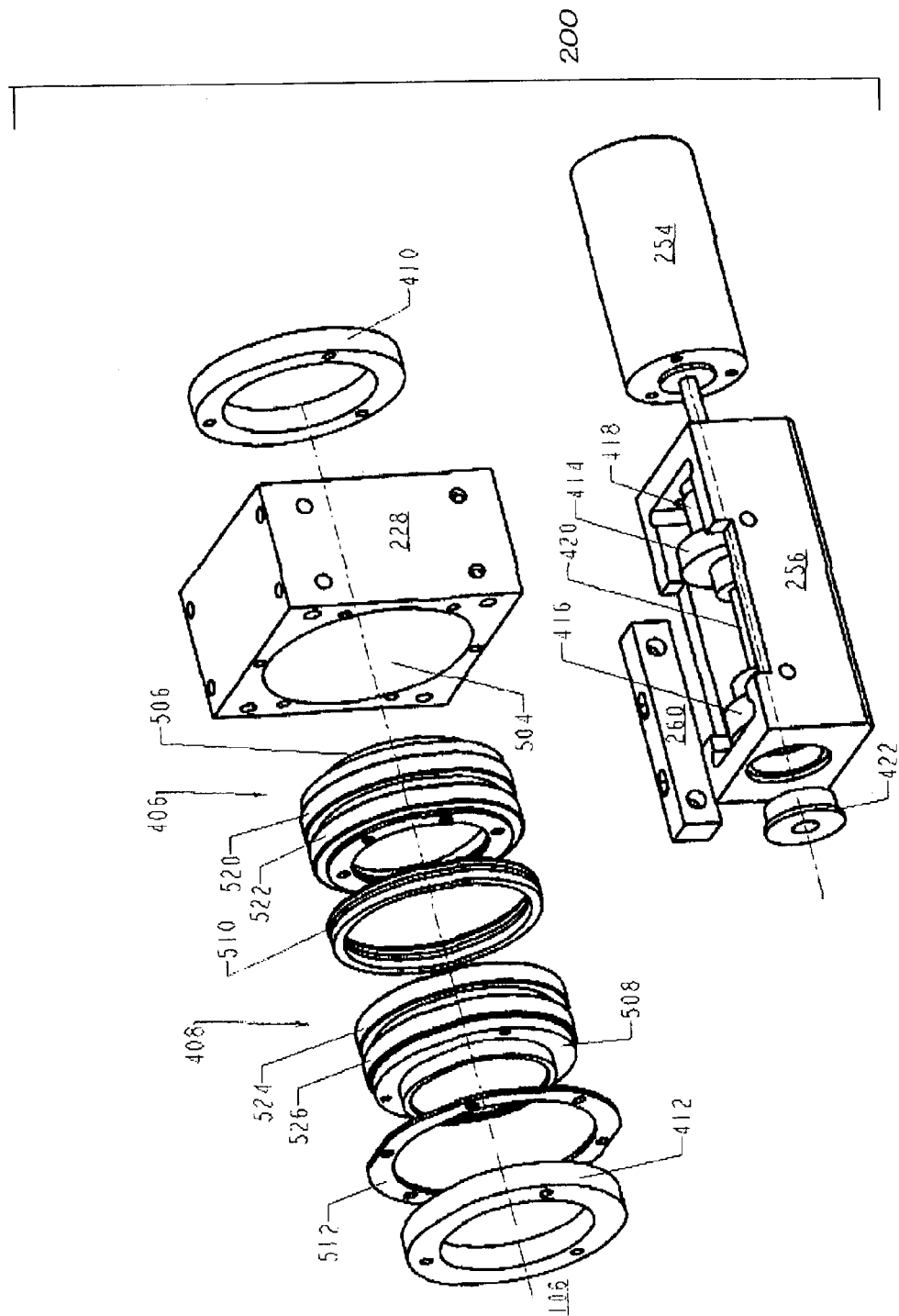
Figure 5a. Exploded view of the CRO unit without distal and proximal attachments

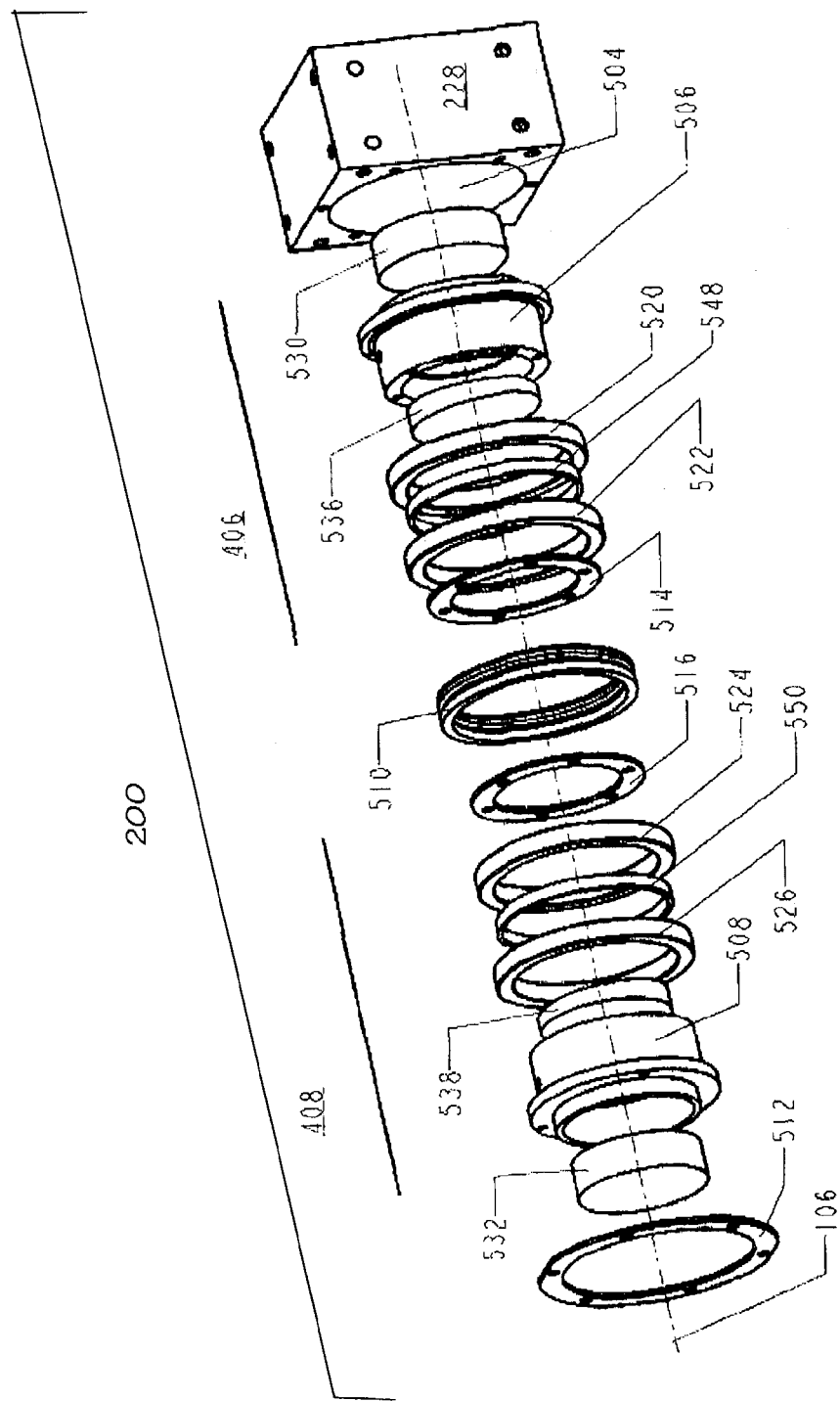
Figure 5b. Exploded view of Rotary Refractive Optics

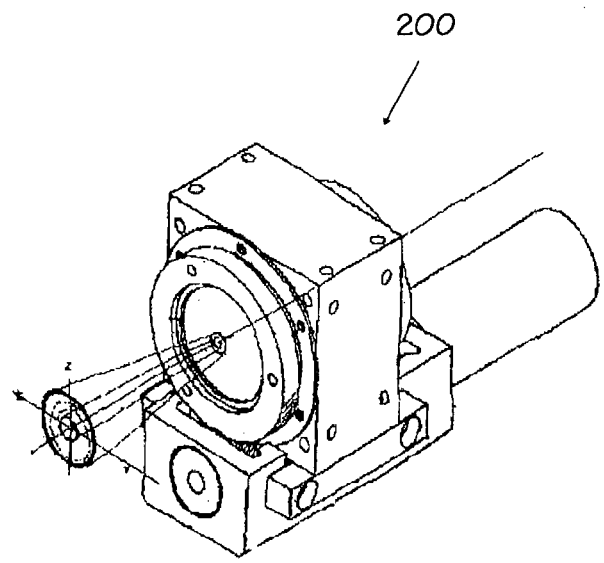
Figure 6. Perspective of CRO Unit without distal and proximal attachments showing focal point pattern
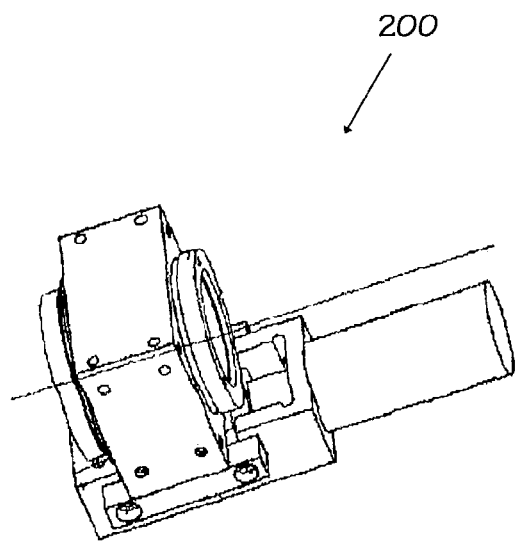
Figure 7. Distal perspective view of CRO Unit without distal and proximal attachments

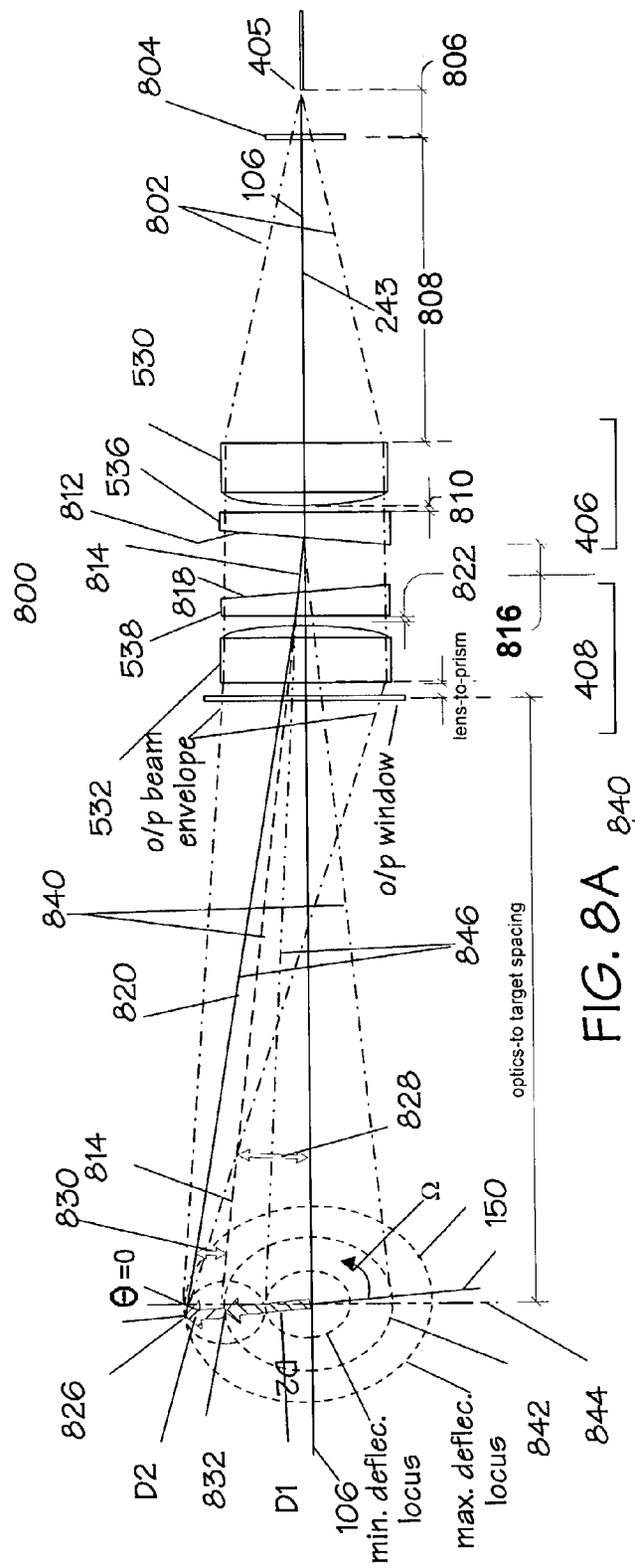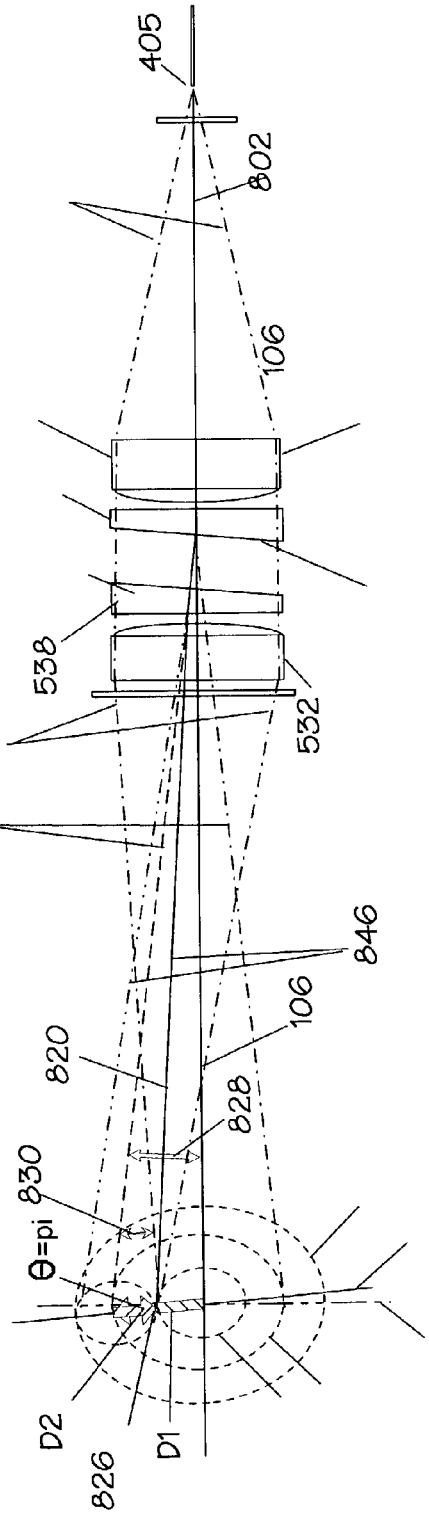
FIG. 8A
FIG. 8B

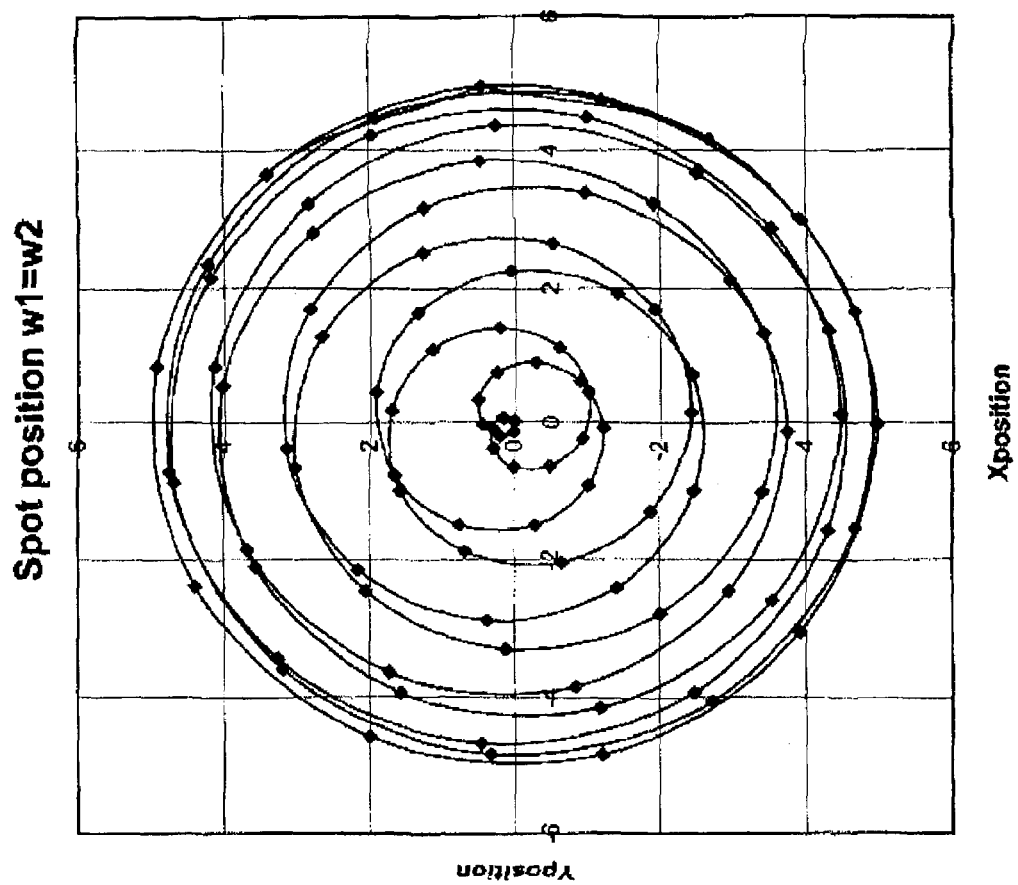
Figure 9a. RRO scanning pattern, wedge angle 1 = wedge angle 2

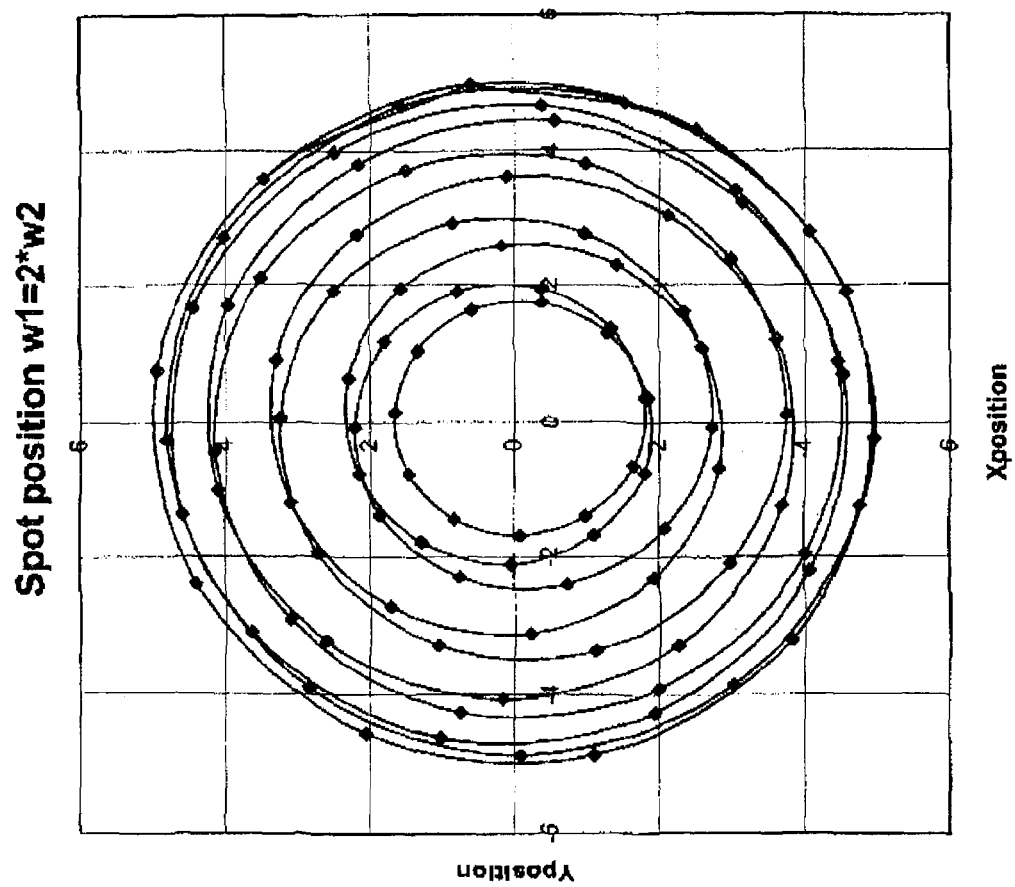
Figure 9b. kRO scanning pattern, wedge angle 1 = 2 X wedge angle 2

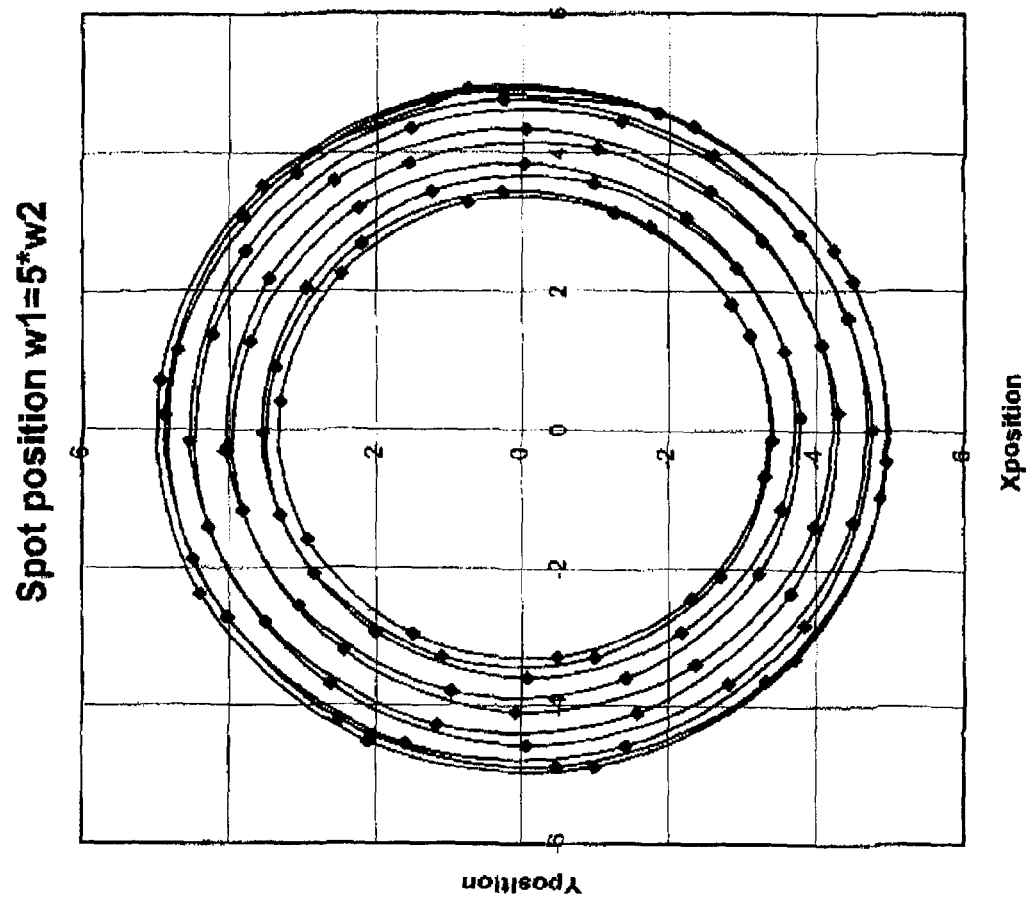
Figure 9c. RRO scanning pattern, wedge angle 1 = 5X wedge angle 2

ROTARY SCANNING LASER HEAD WITH COAXIAL REFRACTIVE OPTICS

This application claims priority benefit of Provisional Application No. 60/329,388 filed Oct. 13, 2001.

The U.S. Government has a paid-up license in this invention as provided for by the terms of DCMA Contract FO9650-99-C-0195, dated 6 May 1999, subject to FAR 52.227-11 (c), "Patent Rights—Retention by the Contractor"

BACKGROUND OF THE INVENTION

Delivery of certain wavelengths of radiant energy is facilitated by transmission along flexible silica fibers. The energy is dispersed from the emitting end of an optical fiber in a widening cone. The energy intensity is generally symmetric about the central fiber axis (i.e., uniformly distributed in azimuth) at the emitting end. The distribution of emitted energy orthogonal to the azimuth angle is highly non-uniform, with highest intensity at the central axis, rapidly decreasing with increasing divergence angle relative to the central fiber axis, sometimes approximated by a power cosine function of the divergence angle.

Energy beam guiding structures are known that use refractive media (e.g. optical lenses) in combination with movable reflective media (e.g. mirrors) to focus and direct diverging radiant energy disposed around the input beam axis to a target of interest. The optical lenses typically convert (collimate) the dispersing radiant energy to a second beam with the radiant energy directed more parallel to the input beam axis. The second beam's energy is distributed over a cross-sectional area defined on a target surface oriented in a transverse plane intersecting the optical axis of the second beam. The size of the defined area is typically limited by the diameter of the lenses. The movable reflective media are coupled to transporting mechanisms and are positioned to modify the direction of the collimated beam as a function of time, typically in a raster pattern scan mode. The dynamic positioning of the reflective media is generally arranged so that the second beams energy, averaged over a multiple number of scan cycles, is distributed as a less intense, more uniform energy intensity distribution over the desired target surface area.

The raster scan mode can be described as periodic deflection of the input beam away from its input axis, in which the period is composed of alternate, orthogonal scanning and stepping cycles. Typically during the scanning cycle the beam is deflected along a first transverse orthogonal axis (e.g. x-direction) at a first angular or linear rate that is constant over each scanning cycle. Next the beam is stepped by a second fixed angular or linear increment, in the direction (e.g. y-direction) orthogonal to both the input beam axis and the first scan axis.

The x-scan rate, scan width, y-step angle (increment) and period are selected to distribute the high intensity energy of the input beam over a larger surface area than that provided directly by the lenses. In addition, one or more condensing (focusing) lens is typically used to focus the collimated beam energy to a fine point at the target's surface. Combinations of mirrors and lenses are used to achieve both effects. The typical objective of these combined reflective and refractive elements is to modify the beams intensity distribution over the width of a limited transverse area and to move the scan area over a target surface to produce a less intense, more uniform, energy intensity distribution over a larger area.

In previous laser scanning heads, the beam is typically reflected from two raster scanning mirrors movably mounted in a housing where they are disposed with the first mirror intercepting the input beam, reflecting it to the second, which then reflects the beam toward the target.

Typically the second mirror is spaced away from the first at a right angle from the input beam axis (i.e. where the beam is reflected nearly 90 degrees away from and back along the housing axis). This type of reflective system results in unavoidable reflective energy loss at each reflection. Such systems may have a housing that is somewhat bulky in section transverse to the direction of the scanning beam to allow for the spacing between first and second mirror surfaces.

Condensing and focusing lenses are sometimes used in conjunction with scanning heads. For example, U.S. Pat. No. 5,780,806 by Ferguson et al., (columns 7 and 8) discloses a reflective scanning laser ablation system in which lenses are used as refractive elements for collimating and focusing a scanning output laser beam.

U.S. Pat. No. 5,204,523 by Appel et al., discloses in claim 1 a method for slowly scanning a beam by refraction of light by an amount determined by varying the wavelength of the light beam. The amount and rate of scanning are relatively small and not conducive to high power laser beam scanning, however.

U.S. Pat. No. RE 33,777 by Woodroffe, Dec. 24, 1991 discloses Laser removal of poor thermally conductive materials, but does not elaborate on beam delivery methods.

U.S. Pat. No. 5,643,476 by Garmire, et al., Jul. 1, 1997 shows a Laser system for removal of graffiti. The beam steering mechanism disclosed uses reflective media with the consequent reflective energy loss.

SUMMARY OF THE INVENTION

As described in detail below, embodiments of the present invention enable features not available in the prior art of radiant-energy beam delivery devices. Embodiments of this invention's architecture particularly enable compact, hand-held laser scanner units. These units incorporate rotating refractive optical elements exclusively for redirecting and guiding the optical energy in a non-uniformly diverging laser beam, which are dispersed from a laser source or flexible optical fiber, to be distributed with a desired time-averaged uniform intensity over a well-defined pattern on a surface region. Specifically, this embodiment provides:

Focusing of radiant energy from a unidirectional, but generally dispersive, source onto a complex curvilinear path within a precisely defined boundary, Compact motion control mechanisms for positioning and focusing of the radiant energy, An essentially unlimited number of non-congruent, intersecting, path segments that can be selected to controllably distribute an input beam's radiant energy, averaged across multiple periodic cycles, over the area within the defined boundaries, Purge gas evacuation passageways for collection and removal of external moisture, soil, and surface ablation products, Purge gas supply passageways for cooling and aerodynamic protection of internal components from penetration by external moisture, soil, and surface ablation products, Conical nosepiece and minimum cross section cylindrical housing for hand held operation and improved surface access, Redundant, optional safety interlocks to protect operators and observers from exposure to unhealthful radiant energy, On-tool control panel, arming switch and emergency shutdown.

Energy Beam Focusing and Directional Control

Embodiments of the present invention receive radiant energy from a unidirectional but generally dispersive radiant energy source with a high-intensity central axis. The embodiments appropriately address a laser beam transmitted through and from a flexible silica fiber as the input energy source. Alternative embodiments of the present invention have application to laser beams emitted directly or indirectly from a laser source. Still other embodiments of the present invention have application to directing and distributing radiant energy by controlled, coupled motion of multiple, cooperating refractive elements, arranged to receive a radiant energy beam.

One preferred laser scanner embodiment of the present invention is the present Coaxial Rotary Optics (CRO) scanner head invention. As in prior art, a preferred embodiment uses one lens or two lenses to focus the dispersive radiant energy. If two lenses are used, a first lens converts a diverging beam to a parallel (e.g. collimated) beam and a second lens converts the parallel beam to a focusing beam to maximize the radiant intensity at the target focal point. The CRO invention, however, uses one or more optical refraction elements (prisms) rather than reflective media along with the lens or lenses to direct and focus the dispersive energy from the diverging optical (laser) beam. Prisms with selected prism face angles and optical characteristics are moved and/or positioned by cooperating motion control mechanisms to modify and control the process of converting the diverging energy beam to a converging (focusing) beam directed for useful purposes.

To describe the present invention, it is convenient to use both X, Y coordinates for the location of the beam intercept on a target plane and azimuth and elevation angle for the deflected beam orientation with respect to the central axis. Let the central axis be the Z-axis the deflection angle then is the elevation angle in this coordinate system when the optical axis is aligned with the Z-axis. The deflection, or elevation, angle for a refracting prism lies in the prism's deflection plane (i.e., the plane perpendicular to the prism faces, coincident with the incident beam), which passes through the optical, or Z-axis, and is positioned in azimuth according to the azimuth orientation of the refractor's deflection (refraction) plane.

In the embodiment, the first prism deflects the input beam by refraction to form an intermediate beam angled away from the optical axis by a first deflection angle in a first refraction (deflection) plane. The magnitude of the deflection angle and orientation of the deflection plane is determined by the beam wavelength, the refractor's shape, optical characteristics, and orientation with respect to the optical axis. The intermediate beam then has a direction determined by the first refractor's azimuth position and refraction angle. A second prism is placed farther along the optical axis to intercept the intermediate beam. The second prism refracts the intermediate beam to form a second beam deflected in elevation angle away from the new optical axis established by axis of the incoming (incident) intermediate beam. The deflection (refraction) angle of the second beam's direction is determined by the first prism's orientation and deflection angle, by the shape and optical characteristics of the second prism, and by the orientation of the second prism with respect to the initial optical axis.

Thus, in embodiments of the present invention, by suitably choosing the shape, spacing, size, orientation, and optical characteristics of the refractors (prisms), one can precisely control the direction of the second beam. With appropriate positioning of one or more of the prisms in the zone between the laser source and the target surface, the focal point of the beam is controlled without a change in the position of the beam source and without the loss introduced by reflective media for steering the beam position.

In the embodiment, motion control devices continuously rotate the two prisms at specific controlled rates to produce time-varying beam deflection angles (e.g., change of deflection in elevation angle from the input beam's axis as a function of time). The rotatable refractor elements (prisms), which are preferably placed coaxial with the input beam, redirect the input energy from the source away from its high-intensity axis by refractive deflection to moving spots on a target surface. A spot's position is controlled by the relative angular position of the rotatable elements. Periodic rotation of the rotatable refractors causes the spot position to trace a complex curvilinear path within a precisely defined boundary.

More particularly, rotation of two prisms at slightly different rates around the optical axis determined by the input beam, directs the input beam's energy to a target surface within a precisely delimited topographical boundary having an abrupt (essentially step-function) energy density transition at the boundary. Simultaneously the continuous rotation and refraction distribute the tightly focused, narrow beam of input energy into a well-defined output energy distribution with controllable uniformity across the entire scanning target area.

In a particular preferred embodiment of the present invention, the motion control devices are rotationally coupled to the two prisms to cause them to rotate about the centerline axis of the parallel input beam at different rotational rates. When the prisms rotate in the same direction, and they have the same optical power (deflection angle) at the wavelength of interest, the scanning pattern fills a transverse disk centered on the prism's axis of rotation. When the prisms rotate in the same direction, and they have different optical powers, the scanning pattern fills a torus (donut) area symmetrically disposed about the central axis. When the prisms are rotated in opposite directions, with the same speed, and have the same optical power, an ellipse or a straight scan line is produced with the angle of the line dependent on the phase (relative azimuth angle) between the two prisms.

Further, suitable selection of the relative and absolute rotation speeds of the two prisms causes the rotation of the second refracted beam to simultaneously precess around the intermediate beam axis in synchronism with the sub-harmonic frequency of the two rotation speeds. Simultaneously, the intermediate beam axis rotates around the central axis in synchronism with the first prism.

In the embodiment, a laser beam source is coupled to the scanning head at the end opposite of the exit aperture and is aligned so the axis of an input laser beam is directed toward the exit aperture along the central axis. The input laser beam illuminates the distal face of the first prism. The first prism refracts the input laser beam to form an intermediate laser beam whose main axis is deflected away from the central axis by the deflection angle of the first prism. The intermediate beam's axis is disposed in the first prism deflection plane so that it rotates in azimuth with the rotation of the first prism about the central axis.

The intermediate laser beam illuminates the distal face of the second prism. The second prism refracts the intermediate laser beam so that it forms the output beam whose main axis is deflected away from the axis of the intermediate laser beam by the second prism's deflection angle. The intermediate laser beam's axis is disposed in the second prism's deflection plane so that it rotates in azimuth around the intermediate beam's axis in accordance with the rotation of the second.

Rotation of the first prism causes the intermediate beam to trace along the surface of a first cone symmetrically disposed about the central axis and projecting toward the second prism and the exit aperture. The projection of the first cone onto a plane orthogonal to the central axis disposed adjacent thereto describes a circular intercept centered about the central axis whose diameter is determined by the first prisms deflection angle and spacing from the prism to the plane.

The effect of the second prism on the deflection of the intermediate beams axis can be understood by considering the result formed when the second prism rotates and the first prism is fixed. With the first prism in fixed position the intermediate beam is disposed at a fixed azimuth angle around the central axis and displaced there from by the first prism's deflection angle. When the second prism rotates with the first prism fixed, the intermediate beam is refracted by the prism to form an output beam that describes the surface of a second cone projecting away from the second prism, and symmetrically disposed about the fixed intermediate beams axis. The intercept of the projection of the second cone on an adjacent target surface is also circular, but its center is disposed on the intercept of the fixed intermediate axis projection, i.e. on the first circular intercept. The second circular intercept has its diameter determined by the second prism's deflection angle and spacing from the second prism to the target surface. The second prism is sized so its perimeter lies beyond the intercept of the intermediate beam and the second prism.

There are two conditions in which the first and second prisms are aligned in azimuth so their deflection angles are in the same plane. In the first aligned condition, the first and second deflection angles lie in the same plane, adding the second prism's deflection to the first prism's deflection. The total deflection of the output beam from the central axis is a maximum equal to the sum of the two deflection angles. In the second aligned condition, the first and second deflection angles lie in the same plane but the second prism deflection subtracts from the first prism's deflection. The total deflection of the output beam from the central axis is a minimum equal to the difference of the two deflection angles.

At all intermediate alignments the two deflections add as vectors with the resulting vector (the output beam axis) having a deflection angle disposed somewhere between the maximum and the minimum. The azimuth and deflection angles of the output beam axis depend on the values of the two deflection angles and their relative alignment between the additive maximum and the subtractive minimum deflections.

The actual intercept of the output beam on the target surface is determined by the spacing between the prisms and the target surface, the value of the two deflection angles and their relative alignment, i.e. the difference in the azimuth angle between the two prism's deflection planes. When the two prisms are in additive alignment the output beam intercept will be at the maximum displacement from the central axis and when the two prisms are in subtractive alignment the intercept will be at the minimum displacement from the central axis. Suitable selection for values of these parameters can vary the minimum-maximum deflection to range from any fraction of a maximum deflection from 0 percent to 100 percent.

Compact Motion Control Mechanism

The preferred embodiment of the CRO unit has a compact mechanism for mounting and rotating optics components using two master-slave gear sets on one motor driven shaft. Two separate coaxial bearing assemblies (rotors) are rotatably supported and positioned within a stationary-housing block (i.e. stator) and interior to the scanning head's outer housing. The bearing assemblies rotatably support and position the external peripheral extent of two spaced-apart optical scanning refractive lens and prism sets. The distal set nearest the input laser beam source includes the first converging (collimating) lens and the first prism. The proximal set, which is spaced apart from the distal set along the central axis, includes the second prism and the second converging (focusing) lens. The optics sets are disposed with their axes of rotation coaxial with each other and the central axis. Each set of optics has a circular outer perimeter and is defined by respective optical characteristics. The bearings are disposed so the optics sets are rotationally supported orthogonal to the central axis passing through their centers of rotation.

Each bearing assembly and optics set is rotationally driven by a separate a master-slave gear set coupled to a drive shaft-motor assembly mounted in the scanning head. The motor is driven at constant speed and the master-slave gear sets are provided with different gear ratios so the optics sets also rotate at constant but different speeds. Suitable selection of the drive motor speed, the master-slave gear ratios, the optical power (e.g. the prism deflection angles), and spacing of the two optics sets enables the output beam axis to rotate in azimuth about the central axis while simultaneously cycling in elevation angle away from the central axis.

The drive motor has electrical power and control signal connections, which are supplied to the motor from controls mounted either on the scanner head or in a remote embodiment through an external connection. The gear shaft turns on a bearing mounted on a proximal end of the gearbox and drives the two gears at the same rotational speed provided by the drive motor. The gearbox is adjustably attached to the stator. The distal drive-gear drives the slave gear at the distal end of the stator. The proximal drive-gear drives the slave gear at the proximal end of the stator. The two slave gears are separately couple to the independently rotatable input and output optics sets of the bearing assemblies. A spring-loaded spacer separates the input bearing assembly from the output bearing assembly.

The embodiment of the present CRO scanning invention is arranged to deflect the output beam away from the longitudinal housing axis sufficient to scan the beam over a reasonably large pattern area on the target surface. The CRO mechanism allows the scanner housing to have a compact transverse cross section making handling of the scanner head comparatively easy.

Energy Distribution on Target Surface

In general, time wise variations in the amount of beam deflection (elevation) angle due to the controlled positioning of the prisms produces a particular desired pattern at the focal point of the converging beam. One can select a set of deflection angles, prism spacing, target surface spacing, and relative rotation speeds of the elements to give an essentially unlimited number of non-congruent, intersecting, path segments on the target surface. The path segments will controllably distribute an input beam's radiant energy, averaged across multiple periodic cycles, within defined boundaries.

In operation as a laser ablation system, the prisms are rotated at uniform rotational speeds that are non-harmonic (i.e. not, integer multiples of one another). Instead, their rotational speeds are fractional integer multiples of one another. The intermediate beam rotates about the central axis in synchronism with the first prism. The output beam precesses around the intermediate beam axis at the harmonic difference frequency as the two prisms rotate. As the output beam revolves around the central axis and precesses around the intermediate axis, the deflection angle of the resulting vector sum ranges between the minimum and maximum deflection angle.

In one preferred embodiment of the present invention, the azimuth and elevation angles of the output beam cycle repetitively to trace a long, continuously spiraling curve that moves between the circular inner and outer boundary limits during multiple periods of revolution about the central axis. The small sub-harmonic difference is selected so the curvilinear path is composed of an arbitrarily large plurality of continuous spiral segments connected one to the next at adjoining ends and tangent to the inner and outer boundary limits. The equinoctial points, i.e. where the curvilinear path intersects the minimum and maximum deflection diameters, precess around the central axis at the difference frequency of the two prisms rotation rates. The output beam azimuth angle and deflection angle vary cyclically with periods that differ slightly by a small beat frequency, the fractional sub-harmonic of the two prisms rotation rates.

The intercept of the moving output beam on the oblique target surface disposed adjacent to the exit aperture forms a complex, cyclically spiraling curvilinear path bounded by the respective maximum and minimum intercept circles. The integrated effect of thus rotating the scanning optics generates a selected large number of such spiral segments contained between the inner and outer pattern boundaries combining to give a time-average to energy intensity level of desired uniformity. At high rotation speeds, the path formed by the moving output beam essentially covers the entire area of the torus bounded by the minimum and maximum deflection angles with nearly contiguous, non-congruent spiral segments in a very short time.

This embodiment is, therefore, a useful tool for distributing the energy from the input laser beam, which is confined to a single point along a unidirectional axis, onto an expanded area with a desired uniformity between very precisely defined boundaries.

Waste Collection and Removal

In the preferred embodiment, impact of the focused laser beam on the target surface ejects ablation products in a direction generally counter to the direction of the incident beam. This evolved waste product enters the scanning head and mixes internally with a purge-gas stream. The nosepiece of the housing is shaped internally to redirect the purge stream after it picks up the evolved waste products. The exiting waste stream is directed outward and rearward in the nosepiece to a passageway within the housing. The passageway delivers the purge flow to the distal waste service hose for transport to the external waste handling equipment in a remote unit. A vacuum blower in the remote unit draws the purge flow through the service hose.

A converging nozzle internal to the nosepiece is mounted facing adjacent to the exit aperture. The exhaust stream draws a protective high-speed airflow through the nozzle toward the exit aperture to prevent the gases and particles from the target spot from reaching and contaminating the scanner optics and rotors.

Component Protection and Cooling

Further, in the preferred embodiment, the purge gas, described above for waste collection, is supplied through a tubular inlet on the side of the housing at the distal end. A hose connected to a remote equipment unit supplies non-combustible gases, or, if allowed in the work area, the inlet is open to ambient air. Because this entry is distal to the CRO unit, the waste removal vacuum, which is in the waste entrainment zone internal to the nosepiece, draws the purge gas in the proximal direction and around the CRO unit. The purge gas, therefore, collects waste heat that is evolved within the CRO unit from the electronics operation and optical power transmission.

As indicated above, the purge gas enters the entrainment zone internal to the nosepiece through a converging nozzle. The nozzle and the nosepiece exit aperture have their interior surfaces disposed around the central beam axis sufficient to allow the laser beam to pass through them at its maximum equinoctial deflection from the central axis. The inlet to the nozzle is on one sidewall near its distal end.

The embodiment includes a protective window that is disposed transverse between the output of the CRO assembly and distal to the converging nozzle. The protective window shield is mounted and sealed at its outer periphery inside a short tube extending coaxial around the central axis from its distal end and connected to the rotor-stator block. The window is transparent to the laser beam and shields the optics assembly from waste products evolved when the laser beam strikes a proximal target surface. The open proximal end of the mounting cylinder connects to a distal circumference of the internal flow convergent nozzle coaxial with the central axis. The nozzle tapers down towards its open proximal end that is spaced distal from a hollow coaxial nosepiece disposed at the proximal end of the scanner. The nosepiece is mounted in the proximal end of a coaxial housing nose cone spaced away from and surrounding the concentrator nozzle.

The pressure differential between the inlet to the converging nozzle and the exit into the entrainment zone accelerates the purge flow and creates an additional barrier to contamination of the CRO unit and electronics by the ejected waste from the target surface. In the preferred embodiment, the pressure differential is such that the purge gas velocity is sufficient to stop and thereby entrain the ejected ablation products before they reach the CRO unit a velocity between 100 and 200 ft per sec is generally sufficient.

The internal components of the CRO, including the bearing assembly and optical sets are also protected from intrusion of moisture, dirt, and waste products from the target surface by a controlled flow of clean, dry source of air or a non-combustion-enabling purge gas, such as nitrogen. The clean, dry purge gas comes from a pressure source connected through the service hose at the rear of the housing. The purge gas is delivered through a dedicated line leading into the CRO stator-rotor assembly from a remote service unit. The purge gas exits the stator rotor assembly and mixes into the waste-collection purge gas stream, described above. Pressure of the clean, dry gas is slightly positive relative to the purge gas so moisture, dirt, and waste products are driven away from the optical components of the CRO unit.

The ratio of purge gas to clean dry gas flow is about 10:1; e.g., 10–30 cu-ft-per min vs. 1–3 cu-ft per min.

For the embodiment that uses ambient air as the purge gas, the sidewall of the tubular inlet includes a circumferentially distributed plurality of bleed holes. If the operator of the scanner inadvertently closes the main inlet opening, e.g., by placing one's hand or article of clothing over it, the bleed holes provide airflow required by the scanner. The operator can't block it off by simple error. If the operator does manage to simultaneously block off the airflow through the open main inlet and the bleed holes, however, an airflow sensor, which is mounted in the housing, senses low airflow and disables the laser firing mechanism.

Nosepiece and Housing Configuration

One preferred embodiment of the present CRO invention is the working head part of a laser ablation system. The CRO ablation scanner head has a longitudinal, hand-held housing with a scanning beam exit aperture at the forward (working) end. The exit aperture is defined in the face of a nosepiece at the proximal end of a forward tapering housing nose. The scanner housing contains an optical fiber connector fixed near the opposite (distal) end of the housing. The connector is fixed adjacent to the distal end to mount one end of a flexible laser fiber coming through a service opening defined in the housing. The connector aligns the fibers emitting end so the diverging laser energy in the beam dispersed from the emitting end is aligned with its major axis coaxial with the housing's longitudinal central axis. The housing's central axis is aligned so its projection forward through the exit aperture will intercept a central point on a transverse surface facing adjacent to the exit aperture.

The central axis is located near the center of the housing's transverse cross-section and projects through the middle of the exit aperture. This optimizes the size of the output-scanning pattern for a given housing body size and simplifies operator control of the output-scanning pattern.

The compact coaxial architecture of the present invention allows the transverse dimensions of the housing to be kept small enough to make a practical hand-held scanner head. Other features of present invention contribute to useful hand-held operation.

The distal end of the housing defines a hose connection with a service opening into the housing. The hose connection is located and configured on the housing to separably mate with a corresponding hose coupling fitted at a connection end of a flexible service hose. The mating housing and hose connection fittings are secure, removable joining to completely enclose a plurality of service conduits from a remote unit to enter the housing interior from the connected service hose end.

The service conduits running between the housing and the remote unit connect to remote functional units supporting the CRO scanner; e.g., a fiber optic cable, electrical wiring for electrical power and electronic control and sense signals. Other like conduits running through the hose provide connections to other supporting functions, e.g., pressurized air for cooling and purging the housing interior and exhaust vacuum for controllably removing waste products evolved at the surface of the target during the scanning process.

The optic fiber cable connection is mounted to receive a fiber cable, which conducts the input laser beam from a remote laser source to the scanner. The emitting end of the cable is fixed in the cable connection. The cable connection's position and orientation in the housing fixes the emitting end to direct the input laser beam emitted from the end of the fiber cable forward along the coaxial central axis defined within the housing. The input laser beam is directed toward the CRO assembly located coaxially with the central axis. The CRO unit, along with the protective window, converging nozzle and waste entrainment space, lies between the end of the fiber cable and the exit aperture in the nosepiece.

The nosepiece has a face optionally shaped to fit a particular target surface configuration when the nosepiece is in actuating orientation with the work surface. A standard nosepiece face is planar, for flat surfaces such as walls and panels. Or it may optionally be formed shaped as a V or inverted V to fit over or into corners and edges. Other face shapes for specialized nosepieces are optional.

The transverse plane of the nosepiece at the exit aperture is disposed from the plane orthogonal to the central axis by a fixed angular dimension to ensure that the focused laser beam is unable to reflect from the target surface at any impact point back into the CRO unit. So long as the target surface is aligned with this disposed exit aperture plane, reflected laser energy will not be refocused back into the CRO unit and overheat the laser beam source at the optical fiber emission point.

Safety Interlocks

The embodiment includes additional safety mechanisms provided in the scanner control system to ensure personnel safety and to safeguard the operation of the invention. A circularly segmented, bi-planar, multi-contact pressure sensor switch (CPS) assembly is configured and mounted at the face of the nosepiece. All the contact switch segments are wired in series with a laser disabling circuit. The laser disabling circuit prevents the laser from firing until all the contact segments are actuated (closed). Only when the operator aligns and holds the housing so the CPS assembly is in abutting contact between the nosepiece face and the target surface with the correct force and orientation are all switch segments of the contact sensor are simultaneously actuated (closed). The CPS ensures that the scanner head can be operated safely even if the operator forgets to turn off the laser pulses when removing the head from the target. A Laser Enabled indicator light on the control panel, toggles on and off with the actuation of the contact switch (and others described below).

The embodiment also includes a light sensitive sensor responsive to the presence of light in the housing. This sensor checks to ensure the housing is sufficiently dark internally. This condition is an additional indication that the operator is holding the nosepiece against an opaque target surface. The sensor provides a disabling signal to the scanner head control system, if the operator holds the nosepiece against a window or like transparent surface.

In the embodiment, a third, optionally redundant safety interlock is a flow sensor associated with the purge gas flow. The pressure differential between the static pressure in the converging nozzle and the static pressure at the exit aperture is an indication of the relative purge flow rate between nozzle and the aperture. If the aperture is open to the atmosphere, less purge gas will flow to the vacuum in the entrainment zone. The pressure differential sensor can then disable the laser firing circuitry.

In the embodiment, additional sensors are included in the scanning head to disable the laser firing circuitry if performance parameters are out of control. These parameters include temperature levels of key optical and mechanical components, active status of motor and rotating components, and a laser pulse detector to ensure continuity of the optical fiber transmission cable.

Operator Interface and Controls

In the embodiment, a panel on the housing exterior provides the operator with control switches, indicators and an emergency shutdown switch. Once power is available, an arming switch (ARM) on the control panel activates the safety electronics. The control panel then indicates that the unit is ready to fire when all the interlock sensors have enabled the respective safety circuitry. In this armed and enabled condition, the scanner's motor and gear system are ready to drive the CRO components, so they will deflect and scan the input laser beam to produce the output-scanning pattern. In the event of an emergency condition, the embodiment also includes a total system emergency off switch.

SUMMARY

The scanned output laser beam pattern is provided by the laser scanning head of the present invention without using any mirrors, i.e., reflecting surfaces, scanning or otherwise. This one distinctive feature, in itself, is an important aid in minimizing the cross-section of the CRO unit in comparison to prior art systems making it readily adapted to a compact, hand held unit. The scan area's size, perimeter, and limits of the energy distribution are determined by selecting particular parameters for optical refracting and motion control elements of the CRO unit and motion controller modules. The CRO unit is contained in a housing shell of moderate size and convenient shape enabling it to be readily controlled by hand-held operation to further distribute energy from the head over a large expanded region on a target surface.

Advantages and Objectives of the Present Invention

The advantage and objective of the present invention is to provide a method and optical architecture to enable more compact and effective radiant energy directing apparatus and systems, including:
  No reflective losses in the path of the scanned energy beam
  Pattern scanning driven with a single, constant rate, driving shaft
  Pattern scanning driven by simple pairs of coupled master-slave gears
  Safety mechanisms to automatically disable the laser beam under conditions potentially unsafe for operators and observers
  Safety mechanisms to automatically disable the laser beam under conditions potentially damaging to the apparatus

BRIEF DESCRIPTION OF THE DRAWINGS

FIG. 1 depicts a perspective view of one embodiment of an RSL head in accordance with the present invention.

FIG. 2a is an elevation view of the RSL head interior with the housing shell partially cut-away.

FIG. 2b shows a magnified cross-section detail of the nosepiece and nosecone in the RSL head of FIG. 2a.

FIG. 2c is an exploded perspective view of the nosepiece and pressure sensitive contact switch in the RSL head of FIG. 2b.

FIG. 3 is a partial cut-away elevation perspective view of the RSL head of FIG. 1 to illustrate the separator structure that guides the inlet and exhaust purge gas flow.

FIG. 4 displays a cross-section view of one preferred embodiment of the present CRO invention in the RSL head of FIG. 1.

FIG. 5a portrays an exploded view of a portion of the CRO unit in FIG. 4 to more clearly point out the drive motor, gearbox and dual Rotary-Refractor Optics (RRO) modules of the CRO unit.

FIG. 5b is an exploded view of the RRO modules including the stator block that positions and houses the RRO units of FIG. 5a.

FIG. 6 presents a front perspective view of the CRO unit without the proximal and distal attachments showing the output laser beam focal point pattern during CRO operation.

FIG. 7 is a distal perspective view of the CRO unit shown in FIG. 6.

FIGS. 8a and 8b depict schematic diagrams order to illustrate the scanning beam behavior created by the present CRO unit invention.

FIGS. 9a, b and c depict some of the possible scanning patterns achievable with the present invention and its variations.

Figure 2D:
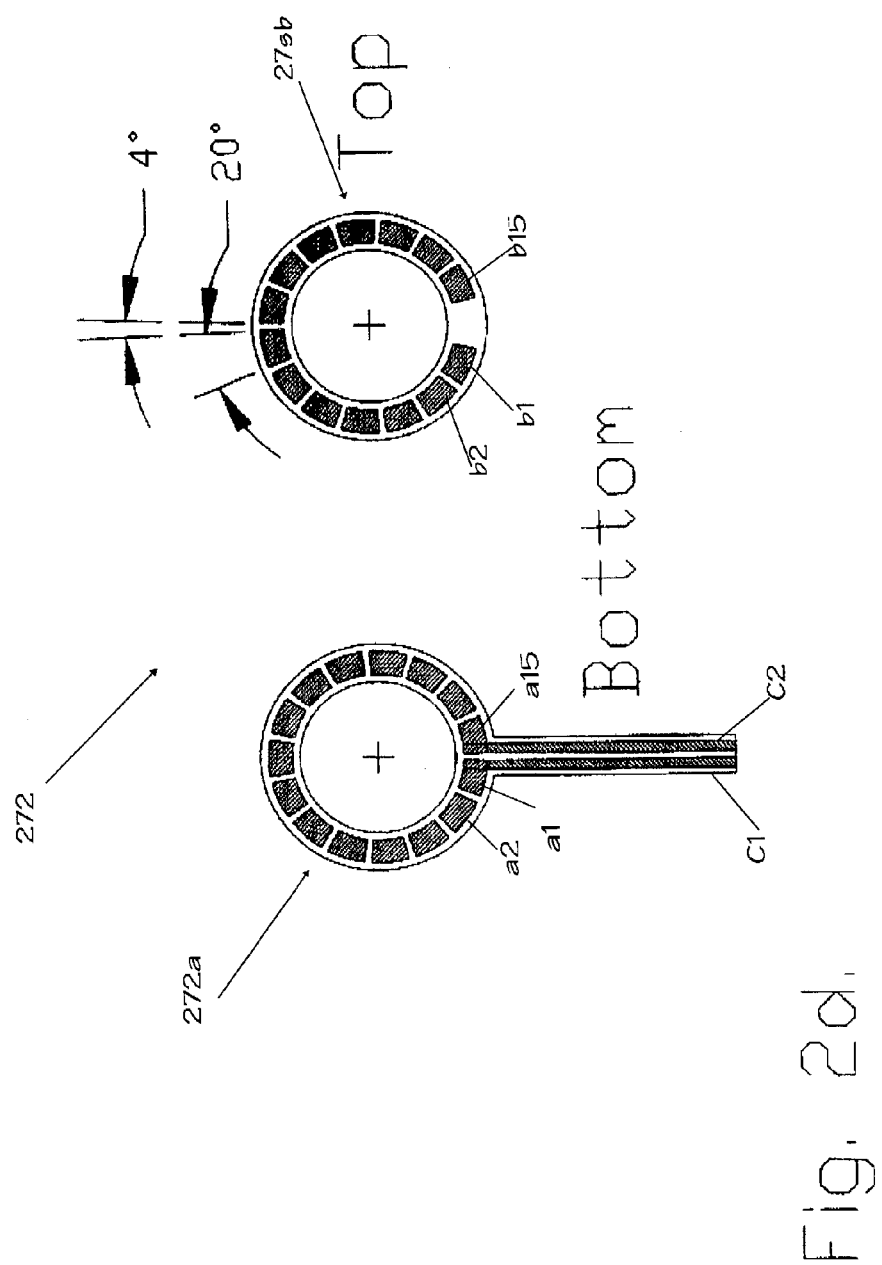
FIG. 2d illustrates plan views of the circumferential distribution of multiple contact segments in the pressure contact switch depicted in FIG. 2c.

DETAILED DESCRIPTION OF A ROTARY SCANNING LASER HEAD IN ACCORDANCE WITH THE PRESENT INVENTIONS

With reference to FIG. 1 there is shown an external perspective view of one preferred embodiment 100 of the present Rotary Scanning Laser (RSL) head invention incorporating an embodiment of the present CRO invention. The RSL head 100 has a longitudinal housing 102 with a longitudinal body of length 104 aligned along a central axis 106 between a proximal nose end 108 and a spaced apart distal hose coupling end 110. The housing 102 forms a closed, continuous rigid shell with an essentially circular cross-section, tapered at the two ends. The housing is assembled from three rigid, thin wall body sections 112, 114, 116 joined at overlapping adjacent ends 118.

The RSL head 100 is a compact, hand held laser-scanning head capable of receiving, delivering and directing radiant energy in a precisely controlled pattern. The head 100 is coupled to a high intensity external radiant energy source (e.g., a high power, fiber guided input laser beam) received through a flexible service hose 124, and delivers a high power, scanning output laser beam 128 projecting from exit aperture 123 at proximal end 108.

The nosecone 112, body cylinder 114, and distal flange 116 sections are thin, strong tubular metal shells formed from standard aluminum or steel sheet metal by conventional forming and finishing processes such as extrusion, bending, cutting, and welding or soldering combined with turning, grinding, polishing and the like. The proximal nosecone 112 is disposed coaxial with central axis 106 and tapers distally outward to connect with cylindrical central body shell 114 by a first one of two tight fitting, rigid, coaxial slip-joints 118. The central body shell extends longitudinally coaxial with central axis 106. Center section 114 connects at its distal end through the second tight fitting, rigid, coaxial slip-joint 118 with distal stepped down flange section 116. Adjacent ends of the three sections join rigidly with each other by the overlapping slip joints 118.

The nosecone-center cylinder pair 112–114 and the body cylinder-distal flange section 114–116 have closely fitting coaxial annular sleeve ends 118. These ends are adapted to form the rigid body of the housing when engaged in sliding overlap and are fixed in place by spaced apart screws engaged in corresponding screw holes 120 defined in the overlapping sleeve ends.

The proximal end of nosecone 112 holds a cylindrical nosepiece 122 disposed at an angle to the central axis 106. Nosepiece 122 forms the exit aperture 123 where the projected output laser beam 128 from the scanner head 100 is scanned across a target surface, here indicated by dashed lines 150—150 at the proximal end 108 of the housing 102.

Hose coupling section 116 funnels down to form the tubular hose connection at the housing end 110. Coupling 116 receives and seals to flexible hose 124 from a remote service unit (arrow 126).

The center tube 114 supports a control panel 130 affixed to one side of its exterior between its two ends. The control panel has a plurality of control switches 131, 134 and indicators 132 disposed on the panels' outer surface.

The panel switches and indicators are connected to sensors and control electronics (not shown) in the RSL head and to other control and actuator functions (described further below) in the remote service unit 126. The switches and indicators 131, 132, 134 on the panel provide an operator with access to system control functions and display information described further below. The control panel 130 is configured so the fingers of an operator's hand may manipulate the switches while the housing is grasped near its mid-section. One switch on the control panel is the emergency off switch (EMO) 131. This switch shuts down the whole system: the motor drive, waste exhaust, laser, and other subsystems in the remote service unit. The EMO switch is placed set off to one side of the panel to be out of the way so the operator is unlikely to hit it by accident. The arming switch 134 energizes the electronics in the tool to allow laser operation when all safety interlocks are cleared. Prior to arming, the safety interlocks must be in the fail conditions, i.e. showing that safety conditions do not exist. Once the interlocks are armed, the operator must then achieve safe conditions to permit laser operation.

In this embodiment, an air inlet 136 is defined in the housing shell near the distal end of the central body section. The inlet 136 seals to and is surrounded by one end of a tubular inlet section 138 sealed to the housing. The inlet tube 138 extends outward a short distance 140 from the housing to its open opposite end. The inlet 136 and tube 138 provide for the entry of air indicated by arrows 142. The air 142 is drawn into the housing interior for cooling and protective flushing and for preventing ablated matter (waste product produced by the scanning beam striking the work surface) from contaminating the optics of the scanning system. A vacuum in the flexible service hose 124 draws the air 142 through the inlet tube 138 into the housing 102. Separators and nozzles, described below, direct the air through the housing 102 to the hose 124. An exhaust blower in the remote service unit 126 (not shown) creates the vacuum.

The inlet tube 138 circumference is formed with a plurality of small apertures (bleed holes) 144 distributed there around. The bleed holes 144 ensure that enough inlet air 142 flows into the housing 102 even if the outer opening of the tube 138 is closed off inadvertently by an operator's hand, a piece of paper, or other relatively impermeable material. However, if the operator does block off the airflow, a sensor in the housing (described below) detects the lack of required airflow and automatically shuts the system down, i.e., preventing laser operation and waste accumulation.

Referring to FIG. 2 along with FIG. 1, there is shown a partial cross-section elevation view of the scanner 100 of FIG. 1 taken along the central axis 106 and perpendicular to the plane of control panel 130. FIG. 2 depicts the interior 202 of the housing and more clearly shows that the housing 102 is comprised of the three rigid thin wall shell sections 112, 114, 116. These sections are conic sections of revolution: the distally widening nosecone 112, the body cylinder 114, and the narrowing funnel shaped hose flange 116. Also visible in more detail are the overlapping sliding sleeve joints 118 between adjacent ends of the cone and body sections and the flange and body sections.

Within the housing shell 202, FIG. 2 shows an outer elevation view of a preferred embodiment of the motor driven CRO unit 226 of the present invention. FIG. 2b and FIG. 2c show additional details at the nosepiece 122. The CRO unit 226 is mounted within inner housing 202 and aligned so that CRO central axis 106 defines and is identical with the scanners optical axis.

The outer body of the CRO unit 226 is comprised of a proximal series of 4 thin wall, rigid, sections 222, 224, 228, 230 joined sequentially together. Section 222–224–228–230 proceeds distal from the nosecone 112 disposed coaxial with axis 106. Section 228 is a fixed stator block that houses the Rotary-Refractive Optics (RRO) assemblies (described below) of the CRO unit 226. An opposite distal face of the CRO unit 226 connects to the first of 3 distal tubular sections 232, 234 (not shown), and 236. The distal tubular sections 232, 234, 236 are also disposed coaxial to central axis 106 and nested sequentially.

Section 222 is a longitudinal truncated conical shell that acts as a laser beam exit nozzle section and purge flow convergent nozzle. Section 222 is disposed coaxial between the surrounding spaced-apart nosecone 112 and the central axis 106. Nozzle 222 subtends a smaller included angle than does that of the coaxial nosecone 112. The nozzle 222 has a narrow proximal open end disposed distal from and facing the nosepiece 122. The nozzle 222 widens appreciably toward its distal end to give concentrating effect and an increased velocity to flow indicated by arrows 223 directed proximally through it toward the nosepiece 122. The nozzle's circular distal end steps laterally outward, joining continuously to a proximal end of a larger diameter base support tube 224, which is also coaxial with central axis 106. The two adjoining ends of 222 and 224 have dissimilar diameters joined together by a flat coaxial rim section projecting transversely between them.

The CRO unit 26 is supported at its proximal and distal ends within the housing 202. near the distal end of the housing, there is the a transverse mounting plate 238 fixed and sealed to the inside of the housing 202 near its end by support bracket 245. Mounting plate 238 and bracket 245 rigidly secures the distal end of the CRO unit 226 through the rigid distal tubular sections 232, 234, 236. Support bracket 245 firmly attaches mounting plate 238 to housing 114. The CRO unit 226 and proximal tubular sections 224, 222 are also supported and fixedly positioned near the proximal end interior to the nosecone 112 by the three support rods 201a, 201b and 201c (not shown). The standoff rods are fixed to the outer surface of support tube 224 at equiangular 120-degree increments near the scanner unit's proximal end. Each rod 201a, b, c has an inner end fixed to the support tube section 224. Each rod projects outward on a radial perpendicular to the axis 106 to bear against the inside of the nosecone section 112 near its distal end.

The standoff rods fix the proximal end of the CRO unit 226 in place by adjustable thread end members 201d bearing on the inside of the nosecone 112 at associated contacts. During assembly and alignment of the CRO unit 226, each rod's adjusting screw is positioned to make all three of the rods uniformly bear on a corresponding support location inside the nosecone section 112. The support tube 224, rigid standoff rods 201a, b, c and the nosecone 112 make a stable adjustable platform for the radial position of the scanners' proximal end. Adjustments during assembly ensure that the scanners' optical axis is coaxial with central axis 106 in the center of the housing 102.

The support tube 224 has a transverse cross-section adapted with an outward radial step outward near its distal end to enclose an output gear assembly (described below) for the CRO 226. the support tube's distal end is fixedly attached, forming a contiguous sealed surface with the proximal outer perimeter of stator block 228. The tube section 230 similarly is fixed, sealed and contiguous to the perimeter of the distal end of the stator block 228. The tube section 230 encloses an input gear assembly (described below) at its connection to the stator block. It's distal cross-section steps to be slidingly received within intermediate tube section 232. The larger dimension at the distal end of the support tube 224 covers a proximal slave gear of the CRO unit 226 (described below). CRO unit 226 has its distal end rigidly connected continuously through combination gear cover-step-down tube section 230 to a first one of a pair of nested coaxial tube sections 232, 236. Sections 232 and 236 are telescoping tubes closely fitted to inhibit airflow from ingress or egress through their overlapping joint.

Section 232 is used to adjust the location of a laser source relative to the optics in the CRO unit 226 during assembly. The telescoping sections 232, 236 are coaxial with the central axis 106 and arranged so that section 232 can slide axially back and forth over section 230 to adjust beam focus (described below). The distal end of tube section 232 nests inside of close fitting proximal end of distal section 236 to form another telescoping, airflow inhibiting joint thereat.

In the embodiment, mounting plate 238 is a rigid member that provides multiple benefits. The distal end of section 236 contacts and is positioned by mounting plate 238. The mounting plate 238 also forms a flange section 240 coaxial with the central axis 106 with its cross-section tapering down from the body of the telescoping tube 236 to a distal tubular end 244. The distal end 244 is configured to make a sealed connection with a proximal end of an internal delivery hose 246 disposed inside the flexible external hose 124. The internal delivery hose 246 supplies clean dry purge gas 250 from the remote service unit 126. The flange 240 and the distal end of tube section 236 are fitted to form an enclosure that minimizes gas flow from inside to outside or the reverse. The clean dry purge gas 250 flows from the mounting plate flange 240 into the tube section 236 through the intermediate tube 232, and into the CRO unit 226.

The tubular end 244 of the mounting plate 238 also receives jacketed optic fiber cable 248. The fiber optic cables proximal end delivers an input laser beam 243 to the distal end of the CRO unit 226.

The mounting plate 238 extends laterally outward toward a portion of the opposing inner housing wall 202 to which it is sealed by a semi-circumferential border bracket 245. The mounting plate 238, border bracket 245 and the separator sheet 280 divides the lateral cross-section of the housing interior 202 between its proximal and distal ends into two sections, 202a and 202b. Section 202a is sized to contain the major portion of the CRO unit 226 from its distal connection with the delivery hose 246 to the proximal nozzle 222. Section 202a is defined laterally and longitudinally within the longitudinal extent of the separator sheet 280 and a major cross-section sector of the interior housing 202. The distal extent of section 202a ends at the transverse mounting plate 238 and flange 240.

Section 202b is configured to provide an exhaust channel for exhaust fluid communication from the proximal end of nozzle 222 to the distal service hose 124. The opposite side of sheet 280 and the opposite sector of the housing interior 202 define section 202b. section 202b provides a open channel open for exhaust fluid communication between the proximal end of the nozzle 222 and the distal end of the housing interior and proximal interior of purge gas exhaust hose 124.

Mounting plate 238 is spaced distal from the support rods 201a by essentially the full-length of the center shell 114. Through the connection with the thin-walled angle section 280, the mounting plate 238 fixes the CRO unit 226. The support rods 201a, 201b, and 201c position the proximal end of the CRO unit in the housing 202, holding it in alignment once the central axis is aligned by means of the adjustable support rods. The mounting plate 238 and rods 201 rigidly support the CRO unit 226 against twisting motions (torque) or lateral impacts or motion of the housing. The rigid support provided by the mounting plate 238 also keeps the scanner units' optical axis centered and aligned with the central axis 106 in the housing. Further, it provides stability for the scanner when the housing is rotated about the central axis or is moved in any of the three orthogonal coordinate axes: i.e., back and forth along the axis 106 or any lateral direction perpendicular to the axis 106.

The Motion Control Unit (MCU) 252 includes the drive motor 254, the speed changing master-slave gearbox 256, and two adjustable mounting bars 260 (one on each side view). The CRO unit 226 and the MCU 252 are fixed together with 4 each threaded mounting screws and accompanying slotted holes 262 (2 not shown) which are bored orthogonal through each of the mounting bars 260.

An aperture 266 is formed in the sidewall of section 224. The aperture allows purge gas flow 214 to flow through 224 and into nozzle 222 along axis 106. The flow 223 exits the nozzle into nosecone 112 space, which is held at a lower pressure condition because flow 212 is exhausted 216 to the remote service unit 126 through service hose 124.

The separator section 280 that separates the CRO unit 226 from the exhaust channel 202b is composed of a sheet of airflow impermeable material continuously sealed around its perimeter to the housing interior 202. The section 280 also acts as a separator, disposed to divide the housing interior 202 into first and second separated parts, 202a and 202b, sealed from each other except at a communicating aperture 282 formed in the separator adjacent to its proximal end. The CRO unit 226 is disposed in the first part, within which the bulk of the longitudinal body is almost completely enclosed. CRO unit 226 is bounded and enclosed along the longitudinal axis 106 by the separator 280, and the associated housing wall portion to which it is sealed. The distal tube section 236 of the CRO unit 226 is bounded and enclosed by the mounting plate 238 and funnel 240 and the and sealed to the distal end of the separator 280 and the housing interior 202 by the bracket 245. Only the proximal end of the nozzle 222 communicates with the second part of the housing interior, where it protrudes through the separator aperture 282.

The airflow separator sheet assembly 280 comprises three sheet sections 280a, 280b, and 280c. The three sheet sections are connected and positioned in the housing to form the separate first and second airflow passageways 202a, 202b generally directing longitudinal airflow in opposite axial directions in the housing 202.

The flow separator sections and the interior-housing wall form passageways 202a and 202b that guide counter-flowing flow in the housing 202. Passageway 202a directs the cleaner, waste flushing intake flow 214 from the inlet 136 to the convergent nozzle 222, and the second flow passageway 202b directs the waste-containing exhaust flow 212 proximal to the exhaust hose. The proximal end of separator section 280 is disposed to cross oblique to the nozzle and central axis such that intake and exhaust flow are isolated from each other until they are mixed at the nozzle 222. The cleaner inlet flow 142 removes also heat from the heat sources in the CRO unit before it is mixed into the exhaust flow stream.

Pressure taps 264a in the sidewall of nosepiece 122 and 264b in the sidewall of nozzle 222 connect to a differential static pressure sensor (not shown). The static pressure differential between the two pressure taps is a measure of the relative flow velocities and mass rate between the convergent nozzle 222 and the laser exit aperture 123. When the RSL head 100 is in contact with the target surface, flow into the head through the laser aperture is zero, and the nozzle flow is at a maximum. When the head is not in contact, air flows into the nosecone 112 through the laser exit aperture 123. The sensor output can, therefore, be used to terminate laser operation and eliminate unsafe laser emission. The pressure-sensor signal also produces an error signal under low flow conditions, which would occur if flow conditions were not present.

A photodiode sensor (not shown) is also positioned in the vicinity of the aperture 266 to determine if ambient light is entering—the housing through the laser beam aperture 108. If light is detected the safety interlocks prevent laser operation.

With regard to FIG. 2b and FIG. 2c, the nosepiece 122 is a hollow spool-shaped assembly of coaxial elements (described further below) fixed together to form a hollow cylindrical body of length 284 between transverse front face 286 and a distal end 288. The forward face is adapted to conform to the target surface 150—150 when the scanner head 100 is in operation. For a planar target surface 150—150, the transverse forward face 286 of the nosepiece face 291 is planar.

The distal end of the nosepiece is adapted to mount within the proximal end of the nosecone 112. The outer body diameter of section 290 steps down to a smooth coaxial annulus 292 that is slidingly received by a corresponding coaxial annular bore 294 in the front of the nosecone 112. The nosepiece is fixed in position with an associated trio of setscrews (not shown) threaded through the corresponding screw bores 295a, b, and c (not shown), which are spaced in equiangular distribution around the nosecone bore sleeve. The setscrews are tightened to fix the nosepiece in place there by pressure applied on the nosepiece annulus surface.

The nosepiece is mounted so that its center axis 296 (and orthogonal front face 286) intersects the housing central axis 106 at a shallow acute angle 298 (and its complement). The nosepiece 122 defines an exit aperture 123. The aperture 123 is sized so that output laser beam 128 projected from the CRO unit 226 can pass through the aperture without intercepting the nosepiece 122.

The nosepiece is configured so its face 286 makes continuous contact with the adjacent target surface 150—150. The output beam 128 impacts the surface 150—150 as long as the RSL head 100 is held with the proximal nosepiece 122 at an enabling angle with sufficient force to seal against the surface.

The nosepiece 122 in this embodiment includes the biplanar segmented (BPS) contact sensor of the present invention. The BPS sensor 272 is shown schematically with its mounting and actuating fixtures in FIG. 2c.

The two switch layers are disposed on opposite sides of a transverse plane orthogonal to the central axis 296 of the nosepiece 122. FIG. 2d shows the facing plane view of the two BPS arrays that are placed in facing opposition together for section 272. When the nosepiece 122 is pressed with sufficient uniformly-distributed, (i.e., symmetrical) axial force onto the target surface 150—150, the pads a1–a15, b1–b15 make continuous electrical contact around the circumference and clear the safety interlock circuit to permit the laser to operate.

Figure 2E:
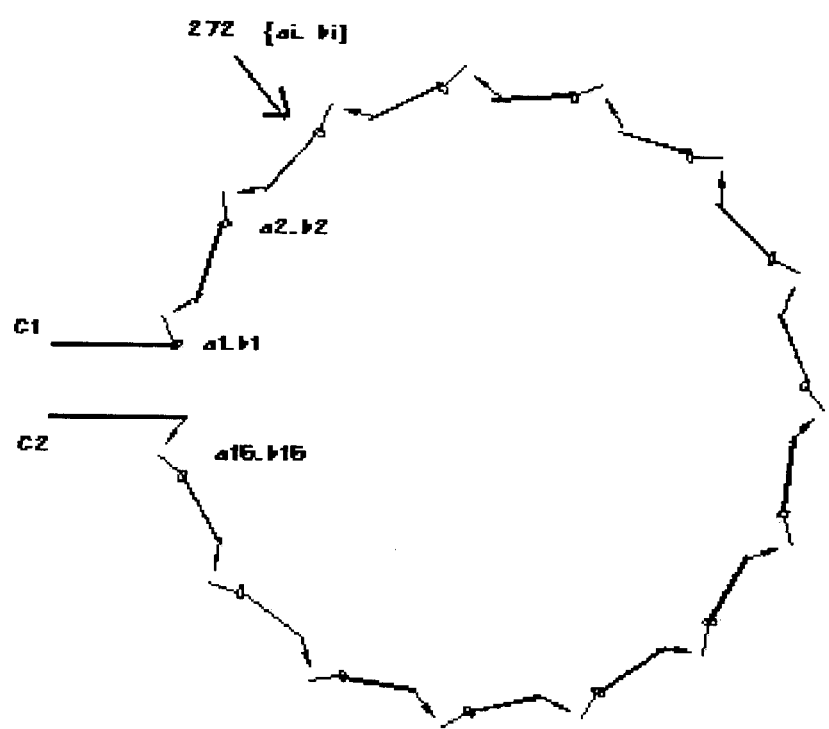
FIG. 2e is an electrical schematic of the BPS switch of FIG. 2c.

With reference to FIG. 2d and FIG. 2e, The BPS switch 272 is a planar array [ai, bi] of conventional tactile (force-actuated) snap switches (a1, b1–a2, b2 - - - a15, b15) spaced apart around the circumference of a ring-shaped dielectric sheet 272a. The snap switches are equally spaced in a circular pattern around the ring. Opposing axial force (normal to the sheet) applied to the snap switch exceeding its actuating force causes each snap switch to actuate and close the electrical circuit between its two contacts [ai, bi]. Referring to FIG. 2e, the snap switches [ai, bi] are SPST NO (single pole, single throw, normally open) and are connected in series so that each snap switch of the array must be actuated for the BPS switch to close and actuate an electrical circuit between the BPS electrical connections C1, C2.

The BPS array 272 may be fabricated from conventional snap switches, membrane switches and snap-dome switches provided by manufacturers such as SnapTron Inc. of 2468 E 9th St., Loveland, Colo. 80537 And Valmark Industries Inc. of Livermore, Calif., Typical characteristics of snap-dome switches are shown in the Table below

| | |
|---|---|
| Contact Current Capacity . . . | Logic levels |
| Contact Bounce . . . | 1 msec typical; 20 msec max |
| Trip Force . . . | To spec: +/−30 grams typical |
| Material . . . | SSTL |
| Plating . . . | Nickel/Silver/Gold Optional |
| Operation Temperature Rating . . . | 0° C. to 50° C. |
| Storage Temperature Rating . . . | −40° C. to +70° C. |
| Contact Life . . . | Exceeds 5 million cycles (in most forces) |

One preferred circuit pattern for the BPS switch 272 is shown in FIG. 2d.

Alternatively, the BPS of FIG. 2d is formed of two circular arrays of 15 spaced apart silver pads deposited on proximal opposing faces of ring-shaped dielectric sheets (e.g., PC boards). The opposing faces of the pad arrays are separated with a plurality of "Microdots" i.e., small, compressible dielectric spacers from prior art, distributed around the arrays. The Microdots are sized and spaced so that the conductive pads do not connect in a rest, zero force, condition. The two rings are disposed in each on two sides around the transverse plane orthogonal to the central axis 296 of the nosepiece 122. FIG. 2d shows the two BPS sensor parts that are placed together to for section 272. When the nosepiece 122 is pressed with sufficient uniformly distributed, symmetrical force onto the target surface 150—150, the pads make continuous electrical contact around the circumference and clear the safety interlock circuit to permit the laser to operate.

When the nosepiece 122 is pressed with sufficient uniformly distributed, symmetrical force onto the target surface 150–50, the pads make continuous electrical contact around the circumference and clear the safety interlock circuit to permit the laser to operate.

The sensor base 271 and the cylindrical retainer 270 are rigidly fixed to the nosecone 112 by the three radial setscrews (not shown). The base 271 contains the threaded holes 295 for the setscrews, which position the nosepiece 122 in nosecone 112. The retainer 270 positions and aligns the coaxial elements and includes the external transverse retainer flange 278 that retains the adapter piece 290. Annulus 292 aligns the nosepiece within the annular bore 294 in the nosecone 112. Base 271 includes a slot 275 where the circuit connection wires from the BPS sensor 272 passes from the nosepiece into the interior of the nosecone. Inner retainer ring 273 snugly fits into the base 271 to hold the inner diameter of the BPS sensor 272. Compression ring 276 and spacer 274 separate the BPS sensor 272 from the adapter head 290. As the operator holding the head 100 applies force axially towards the target surface, the reactive force compresses ring 276, which presses the spacer 274 into the BPS sensor 272 to activate the electrical circuit. The inner diameter of the adapter head 290 fits slidingly over flange 278 on retainer 270. At the point where the compression ring 276 is in its fully relaxed state and no pressure is applied to the BPS sensor 272, the adapter head 290 is in its most proximal position, and space 297 (See FIG. 2b) exists between adapter 290 and retainer 270. A circumferential spring retainer clip 293 (FIG. 2b) resides in three equiangular slots 277a, b, and c (b and c not shown) to retain the adapter 290 when force is not applied. When force is applied, space 297 is reduced, and ring 276 is compressed. A force that is not symmetrical will compress only a portion of the BPS sensor and one or more of the contact pads will not be in contact.

The BPS contact sensor 272 is connected electronically in series with the differential pressure sensor (connected to taps 264a and 264b) and photodiode sensor (in aperture 266) to ensure that the RSL head is in sealed contact with the target surface before laser operation can occur. When not in surface contact, any of these sensors produce one or more safety interlocks to prohibit unsafe laser operation.

Referring to FIG. 3, there is shown a perspective view of an interior portion of the RSL head 100. The nosecone 112, central body section 114, aft flange 116, waste hose 124, and delivery tube 246 are shown partially cutaway to display a more detailed perspective view of the intake and exhaust airflow path. Intake air 142 enters the intake aperture 136. The separator 280 constrains the intake air 142 to move forward as proximal-directive, intake airflow 214 toward the proximal end 108 of the housing interior. The flow 214 enters the converging nozzle 222 through aperture 266, accelerates proximally, and exits the nozzle, where it mixes with ablation products from the target surface. The vacuum condition in the waste hose 124 draws exhaust flow 212 distally between 280 and the outer housing 102. The flow 212 passes through flange 116 and is carried to the remote service unit 126 as waste laden purge flow 216.

The delivery tube 246 surrounds the optical fiber cable 248 and electrical cables (not shown) and connects through hose coupling 240 located at the distal end of the RSL head 100. In the radial space around the cables, purge gas 250 (e.g., carefully filtered, dried, and pressurized nitrogen or air) flows proximally into and through the interior of the RSL head 100. This flow 250 is at higher pressure than airflow 214 and exits the CRO unit 226 through two apertures 225, 227 in the slave gear covers 224, 230.

The two apertures 225, 227 are used to position Hall effect sensors (not shown) in close proximity to slave gears 410, 412 (See FIG. 4). These sensors detect rotation of the gears and provide an error signal to the control panel 130 (See FIG. 1) when no rotation is occurring. Electronics can also be programmed to provide rotation dependent control functions, as needed. The distal telescoping tube 236 is provided with a photodiode aperture 268. A photodiode sensor (not shown) is mounted inside the tube 236 and arranged so that it detects the laser beam as it is emitted from the laser beam source 405. Electronics compare the laser-triggering signal to the photodiode signal to confirm beam transmission. If the signals do not match, laser operation is interrupted and an error condition appears on the control panel 130. The Hall sensor and the photodiode act to protect the equipment and increase personnel safety in the event of system malfunctions.

FIG. 4 shows a cross-section elevation view of the interior of the RSL head 100 and indicates the nominal flow path of the clean purge flow 250 through the CRO components. The enclosing shell, formed by sections 222, 224, 230, 232, 234, and 236 connected proximal and distal to the stator block 228, separates the Rotary-Refractor Optics (RRO) units 406, 408 from the inlet airway 202a in which the CRO unit 226 is mounted. The clean dry purge flow 250 exits the delivery tube 246 and enters the space within cylindrical section 236. The flow 251 passes through the clamshell clamp 234 and the distal end of focusing collar 232 through apertures (not shown), which are transverse to the section view shown. The flow 253 leaves the interior space of the gear cover 230 through the space between the gear cover 230 and the distal gear 410, and it either exits through aperture 227 (See FIG. 3) or enters the gearbox 256. The flow 255 exits the gearbox 256 through the space between proximal gear 412 and gear cover 224 and then exits the CRO unit 226 through aperture 225 (See FIG. 3). Flow 255 is prevented from exiting directly into section 224 and exhaust nozzle 222 by the coaxial, transverse output glass window 452. The window 452 is mounted in section 454 within the support tube 224, proximal to the output lens of the CRO unit 226. Referring to FIG. 3, flow 255 mixes at aperture 225 with inlet ambient purge flow 214 coming through passageway 202a. The mixed flow of inlet air 214 and spent purge gas 250 then exits through aperture 266 into section 224 and then through nozzle 222, where is it used to flush away waste products evolving when the laser beam strikes the target.

Referring again to FIG. 4, a cylindrical optic fiber connection 402 is mounted coaxial with the axis 106 and input laser beam 243 and supported by the clamshell clamp 234 adjacent to the distal end within the tube 236. The fiber connection cylinder 402 is configured with a retainer 404 to receive proximal end 405 of optical fiber 248 entering the RSL head 100 from the internal service hose 246. The retainer 404 holds the end of the fiber, aligned so that laser energy transmitted from a laser source at the other end of the service hose is emitted as the input laser beam 243 parallel to, coaxial with, and aligned to the central axis 106. A transparent window 403 is mounted transverse to the beam at the distal end of the cylinder connection 402 to protect the proximal end of the optical fiber.

Referring to FIG. 5a there is shown an exploded view of the CRO unit in FIG. 5a in combination with FIG. 4, the CRO unit 226 has stator block 228 with stator bore 504 coaxial with central axis 106. The stator block 228 is adapted to support a pair of RRO units 406, 408 spaced apart along central axis 106. The RRO units 406, 408 are attached coaxial with central axis 106 to respective first and second spaced-apart peripheral slave gears 410, 412 that mesh with corresponding first and second spaced-apart master drive gears 414, 416 in the gearbox 256 of MCU 252. Both master gears 414, 416 are solidly connected to drive shaft 420 to turn at the same rate. Coupler 418 solidly connects drive shaft 420 to drive motor 254. Shaft 420 is supported at its opposite end by shaft bearing 422 in the gearbox 256. The slave gears 410, 412 are mounted to respective outside surfaces of coaxial input and output rotor mounts 506, 508. The two RRO units, which are spaced apart by a spring-loaded spacer 510, are pressed into the inner bore 504 of the stator block 228 until the outer race of the distal bearing 520 contacts a shoulder in the distal end of the bore 504. Retaining ring 512 is screwed to the stator block 228, thereby compressing the spring spacer and holding the two RRO units 406, 408 in longitudinal position. The inner diameter of ring 512 mates with the proximal outer race surface of proximal bearing 546.

Referring to FIG. 5b, the first (input) RRO unit 406 includes an input refractor lens 530 and a spaced-apart first (input) circular wedge refractor (prism) 532. The second RRO unit 408 includes a second output circular wedge refractor prism 534 and output refractor lens 536. The lens and prisms in the two RRO units 406, 408 are positioned longitudinally and spaced apart by the inner contour of their respective mounting blocks 506, 508. The lenses 530, 536 and prisms 532, 534 are disposed with optical axes aligned with the housing central axis 106. A bonding compound holds lenses and prisms in place.

Each of the two RRO units 406, 408 includes a proximal and distal bearing. The inner race of distal bearing 520 of unit 406 mates with an elevated profile of rotor mount 506. The proximal bearing 522 of unit 406 is spaced apart from bearing 520 by a spacer 548, which solidly contacts the inner race of both bearings 520, 522. Retaining ring 514 attaches to the mounting block 506 and compresses the respective inner races of the bearings 520 and 522 and the spacer 548. Likewise for RRO unit 408, attachment ring 516 compresses inner races of the bearings 524, 526 and spacer 550 to rotor mount 508.

FIG. 6 and FIG. 7 depict two perspective views of the motor driven CRO unit 226, in the absence of the gear covers 228 and 230. These views illustrate the input laser-beam 249 incident on the input lens 530 and the CRO output beam 128 projecting from the output lens 536.

The invention uses rotating optical prisms 532, 534 rather than reflective media, (i.e. mirrors) for scanning, and it takes advantage of lenses 530, 536 for concentrating and focusing the scanning beam. Because an input laser beam typically diverges from the laser source, input (collimating) lens 530 is coaxially positioned between the fiber end 405 and the rotating optical prisms 532, 534 in the CRO unit. The input lens 530 captures essentially all of the laser energy from the input laser beam, collimates it parallel to the central axis 106, and illuminates essentially the entire input prism 532. This is known to help minimize the diameter of the focused output laser beam, and thereby increases the intensity of the scanning spot. In similar fashion, an output (condensing) lens 536 is positioned coaxially along the central axis 106, between the rotating optical prisms in the CRO unit and the exit aperture to focus essentially all the collimated energy delivered by the prisms.

Regarding input prism 532 and the spaced-apart output prism 534, practical prism wedge angles for the present invention need only be a few degrees to achieve practical scanning pattern size with compact laser scanning head dimensions. The wedge angles of the prisms deflect the laser beam passing through them by a deflection angle, given according to Snell's Law. The deflection angle is a function of the wedge angle of the prism, the incoming light's angle of incidence with respect to the prism, and the index of refraction of the prism operating in air or nitrogen. The deflection angle of each prism also lies in the deflection plane, and thus laser beams incident on each prism are deflected by the prism's deflection angle and are directed along the prism's deflection plane.

Turning each prism about its axis of rotation (in this case, the common central axis) also rotates the respective deflection plane in synchronism. Thus, a laser beam incident on each prism is deflected to change its direction both in elevation angle and in azimuth angle. The deflection angle of the prism determines the elevation angle, and the amount of the prism's rotation determines the azimuth angle.

In FIG. 8a and FIG. 8b, diagram 800 depicts schematically the optical elements of the RRO modules 406 and 408 of the CRO unit 200 of the present invention in two different positions.

FIG. 8a shows the spaced apart input RRO module 406 and output RRO module 408 aligned and disposed coaxially along the central axis 106. The modules are rotatably supported and driven as described above and located between the laser source 405 and the target 150. Energy from input laser beam 243 diverges from the end of fiber 405 as indicated by dashed lines 802. The beam energy 802 passes through input protective window 804 and is captured by input lens 530. The window is spaced distal from fiber 405 by fiber-to-window spacing 806. The input lens 530 is spaced distal from window 804 by window-to-lens spacing 808. Beam 243 is collimated by lens 530 and received by input prism 536. Input prism 536 is spaced from lens 530 by lens-to-prism spacing 810. Input prism 530 refracts the energy from incident beam 243 and emits it from its distal face 812 according to its angular position (azimuth angle) and wedge angle as intermediate deflected beam 814. Output prism 538 is spaced distal from input prism 530 by prism-to-prism spacing 816 and receives the laser energy from intermediate beam 812 at its proximal face 818. Output lens 538 refracts the energy from intermediate beam 814 and emits it as deflected output beam 820 through output lens 532. Lens 532 is spaced distal from prism 538 by prism-to-lens spacing 822. Output lens 532 concentrates the energy (in the envelope indicated by dashed lines 824) from the deflected beam 820 and focuses it onto an intense output spot 826 on the target surface 150.

In FIG. 8a, the prisms 536 and 538 are shown oriented so the deflection planes are coplanar, parallel with input prism deflection angle 828 adding algebraically with output prism deflection angle 830. This causes deflection of the output spot 826 from the central axis 106 to be a maximum.

In FIG. 8b, the prisms 536 and 538 are shown oriented so the deflection planes are coplanar, parallel with the deflection angles 828 and 830 algebraically subtracting so that the deflection of the output spot 826 is a minimum.

If the wedge angles of the two prisms are equal and the two deflection planes are parallel and coplanar, the output beams maximum deflection is twice the deflection of one prism. Conversely, when the deflection planes are anti-parallel, for equal wedge angles the minimum deflection is zero.

When the deflection planes are oriented between parallel and anti-parallel the output spot deflection is the vector sum of the individual deflections. The solution for the magnitude of the output deflection, |D| is given by:

$$|D| = \frac{(|D^2|\cdot\cos(\Theta) + |D||D| + |D1\cos(\Theta)\cdot|D2|D^22)}{\sqrt{2\cdot|D1\cos(\Theta)\cdot|D2||D^2 + |D^21}}$$

Where $\theta$ (the relative azimuth angle) is the angle between the input prism deflection plane and the output prism deflection plane, |D1| (the maximum deflection caused by the first prism) is the magnitude of a vector from the intercept of the central axis 106 at the target, to an intercept 832 of intermediate deflected beam projected from the input prism to the target surface 150, and |D2| (the maximum deflection caused by the second prism) is the magnitude of a vector from the intermediate beam intercept 832 to the intercept of the output beam 826 at the target.

The azimuth orientation Ω of the output deflection relative to the azimuth orientation of the input prism about the central axis, is given by:

Ω=arc tan[D1(sin(θ)/{D1cos(θ)+D2}] π

Referring to FIG. 8a, in the maximum deflection orientation, the input prism 532 deflects the input ray 243 received along the central axis 106 into intermediate deflected ray 814. This intermediate ray exits the output or proximal surface 812 of the first prism 532 in a first deflection plane passing through the central axis and perpendicular to the two faces of the prism. As the first prism is rotated about the central axis 106, the intermediate ray 814 precesses about the central axis along the surface of a first deflection locus 840. The first deflection locus 840 has the shape of a cone whose apex lies on the central axis 106 at the principal point of the first collimating lens and whose included apex angle is 2 times the first prism's wedge angle.

In the absence of the second prism-lens pair, the intermediate ray 814 would merely describe a hypothetical oval path 842 on target surface 150 in planar contact with the nosepiece face. The hypothetical oval path on 842 the target surface 150 is the projection of a circle (not shown) formed by the intersection of the first deflection locus 840 projected onto a virtual plane 844 located perpendicular to the central axis at the proximal nosepiece.

The addition of the output-lens prism pair accomplishes two objectives. First, the second prism 538 deflects the intermediate ray from the first lens-prism pair and alters its direction to produce the scanning output beam 820. Secondly, the output lens element 532 is a condensing lens with convex faces selected to focus the collimated energy from the first prism into the highly intensified output laser spot 826 at the target surface in contact with the nosepiece.

The intermediate locus 840 intercepts the second prism 534 at the first deflection angle 828 along a nearly circular elliptical path surrounding the central axis and displaced away from it by a transverse radius determined by the first deflection angle and the spacing between the prisms. The path is exactly circular or elliptical depending on how the first and second prisms are disposed transverse to the central axis. For exact circularity, at least one face of each is perpendicular to the central axis.

The situation for the second (output) prism 534 is somewhat different, because the laser beam incident on this prism is the first refracted beam 814. The first refracted beam 814 is not parallel to the central axis and, therefore, intercepts the second prism at its elevation angle (the first deflection angle) on the second prism's receiving face 818 and is displaced from the central axis (by the transverse radius). Thus the second prism refracts the first refracted (i.e., the intermediate) laser beam and produces the second (i.e., output) refracted laser beam 820 according to Snell's Law and the output prism's deflection plane's azimuth angle θ relative to the first prism's deflection plane azimuth angle (not shown).

Each complete rotation of the second prism's deflection plane relative to the first prism's deflection plane in this arrangement causes the second refracted laser beam to describe a second conical locus 846. The second locus 846 has a second axis of rotation 848 coaxial with the first refracted laser beam and a principal point determined by the transverse radius and the azimuth angle of the first prisms deflection plane.

The combination of the first and second conical loci 842, 846 generates a complex locus in the manner of a circular cycloid, for the second refracted laser beam. In one preferred embodiment of the present invention, the first and second prisms are coupled through separate gear set assemblies to a single drive shaft driven by a motor. Each gear set is selected with its own gear ratio. The output beam describes a complex curvilinear path (e.g., a circular cycloid) that doesn't repeat until both the input and output prisms have simultaneously completed an integral number of revolutions, so they each return exactly back to their starting position. The first and second gear ratios are selected so that synchronous rotation of the first and second prism by the motor take an exceeding long time for each prism to rotate an integer number of times, i.e., the two integers are a commensurate ratio. One particular preferred embodiment has an input gear ratio of 35 to 72 and an output gear ratio of 32 to 75.

For each $R_m$ motor revolutions, the input prism turns $R_1=R_m*35/72$ revolutions, and the output prism turns $R_2=R_m*32/75$ revolutions. The smallest integers for simultaneous, complete (integral) revolutions of both the input and output prisms are obtained by solving for the smallest value of $R_m$, which makes $R_1$ and $R_2$ integers. The product of the gear ratio divisors is 72 by 75, equal to 5400. In the period that the motor turns 5400 times, $R_1$ will turn 32*5400/75=2304 complete integral revolutions and $R_2$ will turn 35*5400/72=2625 integral revolutions. At a typical motor speed of 24,000 rpm (i.e., 400 revolutions-per-second), the scanning pattern for the output beam doesn't repeat its target position for an elapsed time of 5400/400=13.5 sec. This amount of time is sufficiently long that the output spot 826 from the RSL head, when slidingly positioned, will repetitively strike very near each and every target surface point. A high-speed motor combined with nearly equal but different gear ratios also ensures that the scanning beam visits nearly every point over the area defined by the scanning pattern in a very short time.

FIG. 9a, FIG. 9b, and FIG. 9c are three graphical representations of different scanning patterns achievable with the present invention. Lines on the figures represent trajectories of the beam focal point on the target surface. Dots are the spatial points corresponding to equal increments of time, where for example, a laser pulse would impact the surface. X and Y positions are relative units. FIG. 9a corresponds to the case where wedge angles of both prisms are equal. FIG. 9b is the case where one wedge angle is twice the other. FIG. 9c is the case where one wedge angle is 5 times the other.

In general, prism wedge angles and gear ratios can be chosen by calculation from the functional relationships between the prism azimuth angles and the scanning path coordinates. The present embodiment has the pattern depicted in FIG. 9b. The two wedge angles are in the ratio of 2:1. As FIG. 9b shows, the scanning pattern for this embodiment is a transverse planar torus, centered on the central axis, having maximum and minimum diameters. These diameters depend on the spacing between the prisms, the distance from the output prism to the exit aperture, and the two deflection angles of the prisms. The 2:1 wedge angle ratio gives slight peaks of energy at the inner edges of the swath corresponding to the inner diameter of the stripping torus. Although the distribution in the scanning area is not completely uniform, careful selection of the respective master-slave gear ratios gives sufficient uniformity. Some non-uniformity is acceptable, because of the anticipated motion of the RSL head during operation.

The pattern in FIG. 9a is, however, not desirable. If the wedge angles of the two prisms are equal (W1=W2), the output beam spends an inordinate amount of time at the center, causing excess energy at the center.

The current embodiment has the lens elements mounted in the rotor assembly with the prisms. In this configuration, the lenses and prisms are positioned together accurately and consistently in close proximity. This helps to minimize the size of the scanner head. The lens elements could alternatively be mounted in the stationery part of the CRO unit but mounting them together is more compact.

The Table below list parameters for one embodiment of the present Rotary Refractive Laser Scanner Invention.

Operation of the Invention

The preferred method of operation is to orient the nose of the RSL head in contact with the surface to be cleaned such that all the safety sensors enable the laser to operate when armed. The operator then moves the RSL head in essentially a linear direction at a regular speed transverse along the surface to be stripped while maintaining enabling contact and orientation between the target surface and the nosepiece. Simultaneously the operator observes the resulting swath created by the projected laser pattern emitted from the moving nosepiece. The operator can speed up or slow down the rate the RSL head is moved along the surface to accommodate variations in thickness or resistance of the surface material to be stripped from the target surface. The operator can use the visual feedback from the resulting appearance of the scanned swath to adjust the speed of the transverse motion of the RSL head and produce a desired result. Therefore, the energy uniformity along the lateral motion is not important. What's more important is the uniformity transverse to the lateral direction.

Once the system is armed, the operator starts the scanner's operation by pressing the face of the housing against the target surface sufficient to exceed the actuating force limit of the scanner's contact switch. To do this, the operator must align the scanner housing so the central axis is properly oriented to the contact surface. Conversely, releasing the actuating force so that at least one of the contact switch segments is deactivated stops the scanner.

This mode of operation means an operator is not required to press a button or toggle a switch each time to stop or start laser scanning/operation. The operator only needs to release the housing face from the oriented contact position on the surface, reposition the scanner's face to a new contact location, apply the necessary contact force with the housing positioned within the operating angle range, and the laser will operate continuously. A dead man's switch is not needed as a disabling device. In effect, the present scanner invention operates as though it has dead man's switch operation, because whenever the nosepiece face comes out of contact the laser is disarmed.

The operator can create a continuous path swept by the scanning output laser beam pattern by dragging the nose of the housing laterally across the target surface and continuously maintaining the activating orientation and forward pressure. The process is very much like the operation of other tools, e.g., a heated paint stripping tool, in which the operator drags the tool's heated edge forcefully across the work surface by holding and dragging the tool with its handle at an optimum angle with the surface.

The embodiments described herein do not limit the scope of the present invention. Variations of dimensions, materials and radiant energy characteristics are all considered to be within the scope of this invention.

TABLE I

Parameter Values for RSL 100

Optical components:

| | |
|---|---|
| Fiber: | Silica with doped silica clad, 0.2 mm diameter |
| Input window: | Melles-Griot 02wbk002 10 mm dia., 3 mm thick |
| Input lens: | Edmund K45-803, 50 mm dia., 12 mm thick, 100 mm focal length |
| Input prism: | Melles-Griot 02prw003, 25 mm dia., 4 mm thick, 3.8 degree wedge |
| Output prism: | Melles-Griot 02prw001, 25 mm dia., 4 mm thick, 1.9 degree wedge |
| Output lens: | Melles-Griot 01 LAO123, 25 mm dia., 6.8 mm thick, 100 mm focal length |
| Output window: | Melles-Griot 02wbk003, 25 mm dia., 3 mm thick |

Distances:

| | |
|---|---|
| Fiber end to input window: | 7.4 mm |
| Input window to input lens: | 33.4 mm |
| Input lens to input prism: | 1.0 mm |
| Input prism to output prism: | 2.0 mm |
| Output prism to output lens: | 2.0 mm |
| Output lens to output window: | 2.0 mm |
| Output window to focus spot | 90.4 mm |
| Focus spot to center of axis | 5.0 mm |
| Nosepiece face-to-axis angle | 10–12 degrees (not critical) |
| Scanning: Motor speed: | 24,000 RPM |
| Input lens/prism gear ratio: | 35:72 |
| Input lens/prism speed: | 10,240 RPM |
| Output lens/prism gear ratio: | 32:75 |
| Output lens/prism speed: | 11,667 RPM |
| Laser firing rate: | 13,000 pulse per second |

Table of Values for Rotary Refractive CRO embodiment of the present invention

We claim:

1. A laser scanning head comprising:

at least one first refractive optical prism mounted to rotate in azimuth about an intersecting rotation axis centered on and transverse to both prism faces, said prism characterized by a selected refractive index and a selected prism angle disposed between said faces;

said intersecting axis and said prism faces defining thereby a deflection angle diverging in elevation angle from said rotation axis in reference plane, wherein said reference plane contains said rotation axis and intersects perpendicular to both faces, said deflection angle characterized by said prism angle and said refractive index in accordance with Snell's Law, said reference plane and said deflection angle thereby rotating in synchrony with rotation of said prism about said axis;

an optical connection oriented to direct input radiant energy from an input laser beam with said beam's principal axis directed coaxial with said rotating axis and said energy is incident on a proximal one of said faces along said rotating axis, in which said incident radiant energy input, forms refracted radiant energy by transmission through said prism as a secondary laser beam disposed according to said deflection angle and said prism rotation;

a motion control mechanism coupled to rotate said prism by an azimuth displacement angle of 2 pi radian about said rotation axis;

wherein said rotation of said prism by an azimuth displacement angle of 2 pi radian around said rotation axis by said driving mechanism causes said secondary laser beam to rotate in synchrony with said azimuth to define a conical locus centered on said axis of rotation coincident with said axis and displacing a solid angle of twice said deflection angle.

2. A laser scanning head as set forth in claim 1, further comprising:

a proximal refractive optics assembly disposed between said optical connection and said prism having an optical axis aligned with said axis, said optics assembly configured to refractively collimate diverging energy rays received from said input laser beam such that energy from said input laser beam is directed parallel to said axis and incident on said proximal face.

3. A laser scanning head as set forth in claim 2, wherein said optics assembly further comprises:

a second refractive optic assembly disposed distal to said prism and configured to cooperate refractively with said prism to concentrate refracted energy from said secondary laser beam energy to focus at an image point moving on a transverse image plane disposed distal from said second refractive optic assembly, wherein said moving image point moves along a path determined by a cyclic functional relationship dependent on angular displacement of said prism.

4. A laser scanning head as set forth in claim 3, wherein each element of said prism and said optics assemblies are each configured with a respective lateral perimeter bounded by a respective transverse radius from said axis such that essentially all refracted laser beam energy is focused at said moving image point as said prism is rotated about said axis.

5. A laser scanning head as set forth in claim 4, wherein said driving mechanism rotates said prism at a selected angular rate such that transport of said head in a lateral direction at a selected speed along a transverse target surface essentially coincident with said image plane causes said moving point to create a distributed energy pattern on said target surface having a sharply limited maximum transverse width orthogonal to said lateral direction, said width fixed by said cyclic functional relationship of said prism angular rotation, said prism deflection angle and separation distances between each of said prism, said optic assemblies and said image plane.

6. A laser scanning head as set forth in claim 5, wherein said lateral speed, said angular rate, said cyclic functional relationship of said prism angular rotation, said prism deflection angle and said separation distances between each of said prism, said optic assemblies and said image plane are selected such that said retracted laser beam energy is distributed across said transverse width within selected minimum and maximum limit values.

7. A laser energy distributing system having a laser beam scanning head in accordance with claim 6, further comprising:

a high speed laser light switching device coupled in combination with said input laser beam by said optical connection, said combination capable of switching said input laser beam to provide said focused laser energy at said moving point end with a predetermined repetition rate, Pr, pulse width, Pw, and irradiance, Ir.

8. The laser energy distributing system in accordance with claim 7, wherein said repetition rate, Pr, is selected from the group comprising above about 7 kHz and between about 5 and 15 kHz wherein said pulse width, Pw, is equal or greater than about 100 ns and less than or equal to about 140 ns wherein said irradiance, Ir, is above a minimum value Ir-min sufficient to Cause said energy distributing on said target surface wherein said minimum irradiance, Ir-min, is above about 1 times 10 to the 7th power watt-per-cm-squared.

9. A laser beam scanner head, in accordance with claim 1, further comprising:

a pressure and angle sensitive laser pulse disabling assembly mounted in fixed relationship with said axis, in which said disabling assembly is configured to disable said laser beam until said head is compressively engaged against said target surface with an enabling compressive engagement force and until said axis is disposed within an enabling operating angle range with said target surface.

10. A laser beam scanner head, in accordance with claim 9,

Wherein said pressure and angle sensitive laser pulse disabling assembly comprises a pressure sensitive switch comprising:

a first circumferential array of spaced apart electrically conductive pads disposed on a first dielectric layer;

a second circumferential array of spaced apart electrically conductive pads disposed on a second dielectric layer;

said first and said second arrays being disposed on opposite sides of a transverse plane orthogonal to an actuating switch axis said pads of the two arrays being sized and spaced apart to extend along equal angular segments of the circumferences of the two arrays;

said first and second dielectric layers being aligned and supported so the a projection of the first pad of the second array onto the first array overlaps adjacent halves of the first two pads of the first array and each succeeding pad of the second array overlaps the two adjacent halves of the succeeding adjacent pads of the opposite array;

said arrays provided with micro-dots of compressible dielectric material disposed circumferentially along the array segments and disposed to project between the two arrays said micro-dots of compressible dielectric material are configured such that opposing facing pads of the two arrays do not make electrical contact when no axial compressive force is applied;

and further, said micro dots being additionally arranged so that under axial compression sufficiently distributed around said array circumference, said micro-dots compressively deform such that all of said facing pads of said opposing arrays are brought into electrical contract forming a complete electrical circuit between conducting leads connected to opposite ends of said first array.

11. The laser beam scanner head in accordance with claim 10, comprising:
a surrounding housing sized and shaped to enable an operator to transport said housing at said selected speed by hand on said transverse path disposed along said target surface with said head compressively engaged against said target surface with said enabling compressive engagement force and said axis disposed within an enabling operating angle range with said target surface.

12. The laser beam scanner head in accordance with claim 11, wherein said housing further comprises:
a built-in waste exhaust structure enclosed therein for removing ablated material from said target surface and exhausting said material to a remote vacuum collection system through an exhaust hose connected between said housing and said remote system.

13. The laser beam scanner head in accordance with claim 12, wherein said waste exhaust structure comprises:
separate inlet and outlet passageways separated by continuous wall sections guiding inlet flow separately through said inlet passageway adjacent to said target surface and guiding said exhaust flow with waste material separately away from said target surface through said exhaust passageway connecting flowingly to said exhaust hose.

14. The laser beam scanner head in accordance with claim 13, wherein said housing further comprises:
a separate coolant passageway configured to separately guide a coolant from a remotely connected coolant source to flow around said prism and said optics assembly to clean and cool said prism and said optics assembly.

15. The laser beam scanner head in accordance with claim 14,
wherein said coolant passageway is further configured to guide coolant discharge from said coolant flow into the said exhaust flow connected to the said remote exhaust collection system after cooling said prism and said optics assembly.

16. The laser beam scanner head in accordance with claim 11, further comprising:
a plurality of safety interlock devices each responsive to a separate physical characteristic in which said interlock devices disable said laser beam until each physical characteristic is within a selected limit range for each device.

17. The laser beam scanner head in accordance with claim 16,
wherein said safety interlock devices comprise at least one fluid pressure sensitive sensor responsive to fluid pressure differential from a first location in said housing a second location in said housing, in which fluid pressure at first and said second locations is responsive to fluid flow in said housing, a photo sensitive sensor responsive to light level within said housing, a temperature sensitive sensor responsive sensitive to temperature and a rotation rate sensor responsive to rotation rate of said prism.

18. A laser scanning head in accordance with any one of claims 1 through 17, further comprising;
wherein said input laser beam is refracted by said first prism to form a first refracted laser beam protecting in a first distal direction away from said first prism and deflected by a first deflection angle away from said central axis, in which said first deflection angle lies in said reference plane in a first direction along said reference plane, a second refractive optical prism having planar, non-parallel third and fourth prism faces spaced distal a distance S1 from said first prism, said second prism mounted to rotate separately in azimuth parallel to said first prism about said central axis, said central axis centered on and oblique to at least one of said third and fourth prism faces;

said third and fourth prism faces disposed at a non-zero second wedge angle defined in a second reference plane perpendicular to both faces and extending along said central axis whereby said second reference plane rotates in synchronism with rotation of said second prism in azimuth about said central axis, wherein said first refracted laser beam is further refracted by said second prism to form a second refracted laser beam deflected away from said first refracted laser beam by a second deflection angle, in which said second deflection angle lies in said second reference plane, wherein said first refracted laser beam rotates around a first conical locus in synchronism with said first azimuthally rotating prism, in which said first conical locus is centered on said central axis and wherein said second refracted laser beam secondarily rotates in secondary synchronism with said second azimuthally rotating prism around a second conical locus centered on said first refracted laser beam at a point of intercept between said first refracted laser beam and said second prism;

whereby said first and second conic loci synchronized to said driving mechanism define a bi-conic locus covering a toroidal area on said transverse plane in synchronism with said driving mechanism.

19. A laser scanning head in accordance with claim 18,
wherein said first deflection angle is selected to be larger than said second deflection angle, and wherein said deflection angles are selected such that said projection of said first refracted laser beam to a first intercepts point on a plane transverse to said central axis and spaced at distance S2 from said second prism is deflected away from said central axis by a radial deflection distance P1, and wherein projection of said second refracted beam to a second intercept point on said transverse plane at said distance S2 from said second prism is deflected away from said first intercept point by a smaller second radial distance P2;

and wherein said driving mechanism is coupled to rotate said first and said second prisms in synchronism to complete w1 integral rotations of said first prism and simultaneously complete w2 integral rotations w2 of said second prism such that said synchronous w1 and said w2 complete rotations of said bi-conically moving said second refracted laser beam inscribe a continuous non-repeating path on said transverse image plane wherein periodic laser beam pulses at a selected pulse repetition rate and directed along said second bi-conically moving second refracted laser beam and focused at said image plane cover essentially all of a toroidal area on said image planes wherein said toroidal area is centered on said central coordinate and bounded between a minimum deflection radius Rmin and a maximum deflection radius Rmax, and wherein Rmin is equal to P1−P2 and Rmax is P2+P1.

* * * * *